United States Patent
Von Novak, III et al.

(10) Patent No.: US 9,762,085 B2
(45) Date of Patent: Sep. 12, 2017

(54) SYSTEM AND METHOD FOR PREVENTION OF WIRELESS CHARGING CROSS CONNECTION

(71) Applicant: QUALCOMM Incorporated, San Diego, CA (US)

(72) Inventors: William Henry Von Novak, III, San Diego, CA (US); Ali Abdullah Shareef, San Diego, CA (US); Mike Yung-Ho Tsai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 14/747,311

(22) Filed: Jun. 23, 2015

(65) Prior Publication Data
US 2016/0099604 A1 Apr. 7, 2016

Related U.S. Application Data

(60) Provisional application No. 62/059,683, filed on Oct. 3, 2014.

(51) Int. Cl.
| | |
|---|---|
| *H02J 7/00* | (2006.01) |
| *H02J 7/02* | (2016.01) |
| *H02J 7/04* | (2006.01) |
| *H02J 5/00* | (2016.01) |
| *H02J 17/00* | (2006.01) |
| *H04B 5/00* | (2006.01) |

(52) U.S. Cl.
CPC ............. *H02J 7/025* (2013.01); *H02J 5/005* (2013.01); *H02J 7/0042* (2013.01); *H02J 7/027* (2013.01); *H02J 7/045* (2013.01); *H02J 17/00* (2013.01); *H04B 5/0037* (2013.01); *H02J 2007/0096* (2013.01); *H02J 2007/0098* (2013.01)

(58) Field of Classification Search
CPC .................................. H02J 5/005; H02J 7/025
USPC .......................................................... 320/108
See application file for complete search history.

(56) References Cited

U.S. PATENT DOCUMENTS

| | | | | |
|---|---|---|---|---|
| 2010/0142509 A1* | 6/2010 | Zhu | ...................... | H04B 1/1607 370/343 |
| 2010/0327766 A1* | 12/2010 | Recker | ...................... | H02J 9/02 315/291 |
| 2011/0057606 A1* | 3/2011 | Saunamaki | ............. | H02J 7/025 320/108 |
| 2011/0148349 A1* | 6/2011 | Kim | ...................... | G01D 21/00 320/108 |
| 2013/0026981 A1* | 1/2013 | Van Der Lee | .......... | H02J 5/005 320/108 |
| 2014/0062395 A1* | 3/2014 | Kwon | ..................... | H02J 50/60 320/108 |
| 2014/0159651 A1 | 6/2014 | Von Novak, III et al. | | |
| 2014/0159653 A1 | 6/2014 | Von Novak et al. | | |
| 2014/0306548 A1* | 10/2014 | Yang | ...................... | H02J 5/005 307/104 |
| 2016/0172893 A1* | 6/2016 | Yoon | ....................... | H02J 7/025 320/108 |
| 2016/0187519 A1* | 6/2016 | Widmer | ................... | G01V 3/10 324/222 |

FOREIGN PATENT DOCUMENTS

WO    WO-2012099965 A2    7/2012

OTHER PUBLICATIONS

International Search Report and Written Opinion—PCT/US2015/050171—ISA/EPO—Dec. 3, 2015.

* cited by examiner

*Primary Examiner* — Arun Williams

(57) ABSTRACT

A system and method for charging a chargeable device is provided. The system can include a wireless charger including a wireless power transmitter d configured to generate a wireless charging field in at least one charging region. The wireless charger further includes a transceiver configured to communicate with the chargeable device. The wireless charger further includes a controller configured to facilitate avoidance of cross connection of the chargeable device with the wireless charger and at least one other wireless charger by initiating a disconnection of a communication link between the wireless charger and the chargeable device based at least in part on a comparison of a detected power level of the wireless charger to a predetermined level indicative of saturation.

30 Claims, 14 Drawing Sheets

000# SYSTEM AND METHOD FOR PREVENTION OF WIRELESS CHARGING CROSS CONNECTION

RELATED APPLICATION

This application claims the benefit of priority to U.S. Provisional Appl. No. 62/059,683, filed Oct. 3, 2014 and incorporated in its entirety by reference herein.

FIELD

The present invention relates generally to wireless power. More specifically, the disclosure is directed to systems, methods, and devices for establishing communications between a wireless power receiver and a wireless power transmitter where the receiver may be positioned within the wireless charging region of the transmitter but is capable of establishing communications with one or more additional wireless power transmitters.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless charger for wirelessly charging a chargeable device. The wireless charger comprises a wireless power antenna. The wireless charger further comprises a wireless power transmitter coupled to the wireless power antenna and configured to generate a wireless charging field in at least one charging region. The wireless charger further comprises a communication antenna and a transceiver coupled to the communication antenna and configured to communicate with the chargeable device via the communication antenna. The wireless charger further comprises a controller configured to facilitate avoidance of cross connection of the chargeable device with the wireless charger and at least one other wireless charger by using at least one of the following: (i) selectively accepting or refusing a data connection between the wireless charger and the chargeable device based at least in part on at least one of: (a) comparison of an area of the chargeable device to a free amount of the at least one charging region; or (b) determination of whether a request to enable a data connection is within a predetermined acceptance time window; or (c) determination of whether any requests to enable a data connection have been previously received; or (d) determination of which request to enable a data connection has the strongest data signal; or (ii) forcing a disconnection of the wireless charger from the chargeable device based at least in part on a comparison of a detected power level of the wireless charger to a predetermined level indicative of saturation; or (iii) turning on the wireless charger after a corresponding random time period has elapsed; or (iv) delay of the acceptance time window if a detected indication of the chargeable device is within the at least one charging region is less than a predetermined value; or any combination thereof.

Another aspect of the disclosure provides a wireless charger for wirelessly charging a chargeable device. The wireless charger comprises means for generating a wireless charging field in at least one charging region. The wireless charger further comprises means for communicating with the chargeable device. The wireless charger further comprises means for facilitating avoidance of cross connection of the chargeable device with the wireless charger and at least one other wireless charger by using at least one of the following: (i) selectively accepting or refusing a data connection between the wireless charger and the chargeable device based at least in part on at least one of: (a) comparison of an area of the chargeable device to a free amount of the at least one charging region; or (b) determination of whether a request to enable a data connection is within a predetermined acceptance time window; or (c) determination of whether any requests to enable a data connection have been previously received; or (d) determination of which request to enable a data connection has the strongest data signal; or (ii) forcing a disconnection of the wireless charger from the chargeable device based at least in part on a comparison of a detected power level of the wireless charger to a predetermined level indicative of saturation; or (iii) turning on the wireless charger after a corresponding random time period has elapsed; or (iv) delay of the acceptance time window if a detected indication of the chargeable device is within the at least one charging region is less than a predetermined value; or any combination thereof.

Another aspect of the disclosure provides a non-transitory computer-readable medium comprising code that, when executed, causes a wireless charger to generate a wireless charging field in at least one charging region. The medium further comprises code that, when executed, causes the wireless charger to communicate with the chargeable device. The medium further comprises code that, when executed, causes the wireless charger to facilitate avoidance of cross connection of the chargeable device with the wireless charger and at least one other wireless charger by using at least one of the following: (i) selectively accepting or refusing a data connection between the wireless charger and the chargeable device based at least in part on at least one of: (a) comparison of an area of the chargeable device to a free amount of the at least one charging region; or (b) determination of whether a request to enable a data connection is within a predetermined acceptance time window; or (c) determination of whether any requests to enable a data connection have been previously received; or (d) determination of which request to enable a data connection has the strongest data signal; or (ii) forcing a disconnection of the wireless charger from the chargeable device based at least in part on a comparison of a detected power level of the wireless charger to a predetermined level indicative of saturation; or (iii) turning on the wireless charger after a corresponding random time period has elapsed; or (iv) delay of the acceptance time window if a detected indication of the chargeable device is within the at least one charging region is less than a predetermined value; or any combination thereof.

Another aspect of the disclosure provides a method for wirelessly charging a chargeable device. The method comprises generating a wireless charging field in at least one charging region. The wireless charging field comprises a plurality of power signals. The method further comprises communicating with the chargeable device. The method further comprises facilitating avoidance of cross connection of the chargeable device with a wireless charger and at least one other wireless charger in which the chargeable device receives power from one of the wireless charger or the at least one other wireless charger while communicating with the other of the wireless charger or the at least one other wireless charger. Facilitating avoidance of cross connection uses at least one of the following: comparison of a detected power level to a predetermined level indicative of saturation; or turning on the wireless charger after a corresponding random time period has elapsed; comparison of an area of the chargeable device to a free amount of the at least one charging region; or determination of whether a request to enable a data connection is within a predetermined acceptance time window; or delay of the acceptance time window if a detected indication of the chargeable device is within the at least one charging region is less than a predetermined value; or determination of whether any requests to enable a data connection have been previously received; or determination of which request to enable a data connection has the strongest data signal; or any combination thereof.

Another aspect of the disclosure provides a wireless charger for wirelessly charging a chargeable device. The wireless charger comprises a wireless power transmitter configured to generate a wireless charging field in at least one charging region. The wireless charger further comprises a transceiver configured to communicate with the chargeable device. The wireless charger further comprises a controller configured to facilitate avoidance of cross connection of the chargeable device with the wireless charger and at least one other wireless charger by initiating a disconnection of a communication link between the wireless charger and the chargeable device based at least in part on a comparison of a detected transmitted power level of the wireless charger to at least one predetermined level indicative of at least one saturation condition.

Another aspect of the disclosure provides a method of facilitating avoidance of cross connection of a chargeable device in communication with a wireless charger. The method comprises detecting a transmitted power level of a wireless charger. The method further comprises comparing the detected transmitted power level to at least one predetermined level indicative of at least one saturation condition. The method further comprises initiating a disconnection of a communication link between the wireless charger and the chargeable device based at least in part on whether the at least one saturation condition exists.

Another aspect of the disclosure provides a wireless charger comprising means for generating a wireless charging field in at least one charging region. The wireless charger further comprises means for communicating with a chargeable device. The wireless charger further comprise means for facilitating avoidance of cross connection of the chargeable device with the wireless charger and at least one other wireless charger by initiating a disconnection of a communication link between the wireless charger and the chargeable device based at least in part on a comparison of a detected transmitted power level of the wireless charger to at least one predetermined level indicative of at least one saturation condition.

Another aspect of the disclosure provides a non-transitory computer-readable medium comprising code that, when executed, causes a wireless charger to generate a wireless charging field in at least one charging region. The code, when executed, further causes the wireless charger to communicate with a chargeable device. The code, when executed, further causes the wireless charger to facilitate avoidance of cross connection of the chargeable device with the wireless charger and at least one other wireless charger by initiating a disconnection of a communication link between the wireless charger and the chargeable device based at least in part on a comparison of a detected transmitted power level of the wireless charger to at least one predetermined level indicative of at least one saturation condition.

Another aspect of the disclosure provides a method of facilitating avoidance of cross connection of a chargeable device in communication with a wireless charger. The method comprises, for each wireless charger of a plurality of wireless chargers operatively coupled to a common power circuit, setting a random value for a time period between (i) power being provided to the wireless charger via the common power circuit and (ii) the wireless charger being turned on. The method further comprises, upon power being provided to the common power circuit, turning on each wireless charger of the plurality of the wireless chargers after its corresponding random time period has elapsed.

Another aspect of the disclosure provides a method of facilitating avoidance of cross connection of a chargeable device in communication with a wireless charger. The method comprises determining a charging area of a wireless charger. The method further comprises, for each chargeable device that attempts to connect to the wireless charger, comparing an area of the chargeable device to a free amount of the charging area. The method further comprises accepting or rejecting the connection between the chargeable device and the wireless charger in response at least in part to the comparison. The method further comprises, in response to accepting a connection between a chargeable device and the wireless charger or in response to termination of a connection between a chargeable device and the wireless charger, revising the amount of the charging area that is free to accept a chargeable device.

Another aspect of the disclosure provides a method of facilitating avoidance of cross connection of a chargeable device in communication with a wireless charger. The method comprises defining an acceptance time window for the wireless charger, the acceptance time window occurring after a chargeable device positioned within a charging region of the wireless charger detects power from the wireless charger, the acceptance time window having a first endpoint at a first predetermined amount of time after power is applied to the wireless charger and a second endpoint at a second predetermined amount of time after power is applied to the wireless charger. The method further comprises receiving a request to enable a data connection from a chargeable device. The method further comprises determining whether the request occurs within the acceptance time window. The method further comprises accepting or rejecting the data connection in response to whether the request occurs within the acceptance time window or not.

Another aspect of the disclosure provides a method of facilitating avoidance of cross connection of a chargeable device in communication with a wireless charger. The method comprises defining an acceptance time window for the wireless charger, the acceptance time window occurring after a chargeable device positioned within a charging region of the wireless charger detects power from the wireless charger, the acceptance time window having a first endpoint at a first predetermined amount of time after power is applied to the wireless charger and a second endpoint at a second predetermined amount of time after power is applied to the wireless charger. The method further comprises receiving a request to enable a data connection from a chargeable device. The method further comprises detecting an indication of whether the chargeable device is within the charging region of the wireless charger and comparing the indication to a predetermined value. The method further comprises delaying the acceptance time window by a predetermined amount of time if the detected indication is inconclusive regarding whether the chargeable device is within the charging region of the wireless charger. The method further comprises determining whether the request occurs within the acceptance time window. The method further comprises accepting or rejecting the data connection in response to whether the request occurs within the acceptance time window or not.

Another aspect of the disclosure provides a method of facilitating avoidance of cross connection of a chargeable device in communication with a wireless charger. The method comprises receiving a request to enable a data connection from a chargeable device. The method further comprises determining whether any requests have been previously received before having received the request from the chargeable device. The method further comprises accepting the data connection if no requests have been previously received before having received the request from the chargeable device.

Another aspect of the disclosure provides a method of facilitating avoidance of cross connection of a chargeable device in communication with a wireless charger. The method comprises transmitting a request from the wireless charger to enable a data connection with the chargeable device. The method further comprises using the chargeable device to determine whether a previous connection of the chargeable device to the wireless charger resulted in cross connection. The method further comprises preventing initiation (e.g., aborting or not initiating) of the request if the previous connection resulted in cross connection.

Another aspect of the disclosure provides a method of facilitating avoidance of cross connection of a chargeable device in communication with a wireless charger. The method comprises receiving one or more requests to enable a data connection from one or more chargeable devices. The method further comprises determining which request has the strongest data signal of the one or more requests. The method further comprises accepting the data connection corresponding to the strongest data signal of the one or more requests.

Another aspect of the disclosure provides a wireless charger for wirelessly charging a chargeable device. The wireless charger includes a wireless power transmitter coupled to a wireless power antenna and configured to generate a wireless charging field in at least one charging region. The wireless charger further includes a transceiver coupled to a communication antenna and configured to wirelessly communicate with the chargeable device via a communication channel established between the transceiver and the chargeable device. The transceiver is configured to receive one or more requests from the chargeable devices for a requested change of a transmitted power level of the wireless power transmitter. The wireless charger further includes a controller configured to receive information indicative of at least one saturation condition of the wireless power transmitter based on the transmitted power level of the wireless power transmitter. The controller is further configured to cause a disconnection of the communication channel between the transceiver and with the chargeable device based at least in part on the information indicative of the at least one saturation condition and the one or more requests from the chargeable device for a requested change of the transmitter power level of the wireless power transmitter.

Another aspect of the disclosure further provides a method of facilitating avoidance of cross connection of a chargeable device in communication with a wireless charger. The method includes receiving information indicative of at least one saturation condition of a wireless power transmitter of the wireless charger based on a transmitted power level of the wireless power transmitter. The method further includes causing a disconnection of a communication channel between the wireless charger and the chargeable device based at least in part on the information indicative of the at least one saturation condition and one or more requests by the chargeable device for a requested change of the transmitted power level of the wireless power transmitter.

Figure 1:
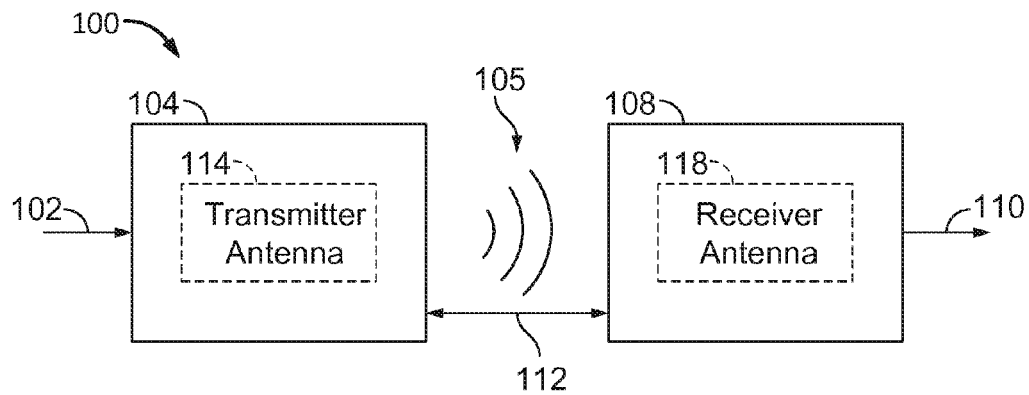
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

In some wireless power systems, and as will be described below, the transmitter and receiver communicate on a frequency other than that being used to transfer power. In some embodiments, it is desirable to establish this so-called out-of-band communication channel independent of the wireless power field used to transfer power. The out-of-band communication channel is useful to reduce the complexity of the in-band transmitter and receiver circuitry. Because in-band power transfer and the out-of-band communication channel have different characteristics, a receiver may be out of out of range for wireless power from a transmitter but within range for out-of-band communication. As a result, when multiple transmitters are present within a given space, cross connection can result, where a power transmitter sends power to a power receiver but connects its control signal to another power receiver, or a power receiver is powered by a power transmitter but has a control signal connected to another power transmitter. This condition can lead to unstable operation, loss of efficiency, and poor user experience. Thus, it is desirable to avoid such cross connection or to detect and remedy such cross connection and initiate proper communication among the various devices.

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are reduced. As such, wireless power transfer may be provided over larger distance in contrast to purely inductive solutions that may require large coils to be very close (e.g., millimeters). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 108. The transmitter 104 may include a transmit antenna 114 for outputting an energy transmission. The receiver 108 further includes a receive antenna 118 for receiving or capturing energy from the energy transmission. In some cases, the field 105 may correspond to the "near-field" of the transmitter 104. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. Efficient energy transfer may occur by coupling a large portion of the energy in a field 105 of the transmit antenna 114 to a receive antenna 118 rather than propagating most of the energy in an electromagnetic wave to the far field. The transmit and receive antennas 114 and 118 are sized according to applications and devices to be associated therewith. When positioned within the field 105, a "coupling mode" may be developed between the transmit antenna 114 and the receive antenna 118.

In one embodiment, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 2:
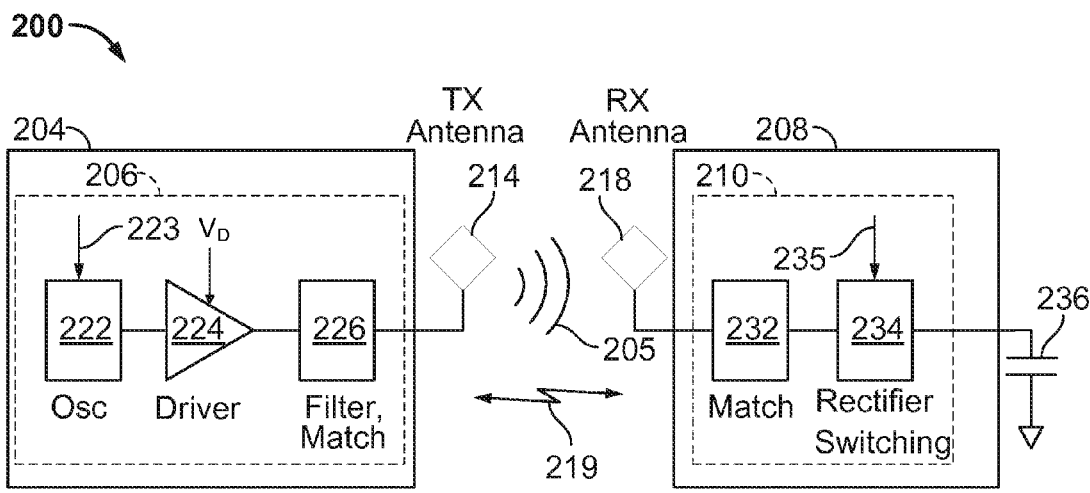
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. In the wireless power transfer system 200, the transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or powering an electronic device. As one example, the power provided may be for example on the order of 300 milliWatts to 10-20 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 205.

As described more fully below, receiver 208, that may initially have a selectively disablable associated load (e.g., battery 236), may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
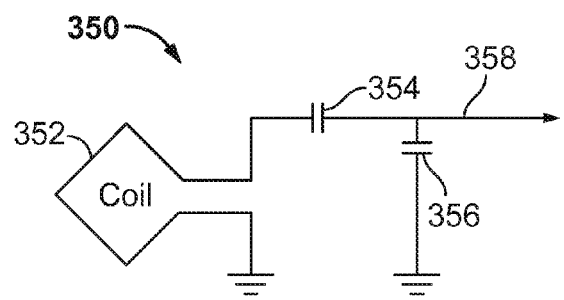
FIG. 3 is a schematic diagram of a portion of transmit circuitry or receive circuitry of FIG. 2 including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown).

The transmit or receive circuitry 350 may be configured as a resonant circuit/structure for resonant inductive power transfer as disclosed above. The resonant frequency of the transmit or receive circuitry 350 is based on the inductance and capacitance. Inductance may be simply the inductance created by the antenna 352, whereas, capacitance may be added (e.g., an additional capacitor in some cases) to create a resonant structure at a desired resonant frequency. As a non-limiting example, capacitor 354 and capacitor 356 may be added to the transmit or receive circuitry 350 to create a resonant circuit that resonates at a resonant frequency (e.g., the operating frequency output by any driving circuitry, an example of which is the driver circuit 224 of FIG. 2). Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. Series or parallel (shunt) resonant circuits may be used in accordance with embodiments described herein. As a non-limiting example, a capacitor may be placed in parallel between the two terminals of the antenna 352. For transmit antennas, a signal 358 with a frequency that substantially corresponds to the resonant frequency of the antenna 352 may be an input to the antenna 352. For a receive antennas, the signal 358, with a frequency that substantially corresponds to the resonant frequency of the antenna 352, may be an output from the antenna 352.

Figure 4:
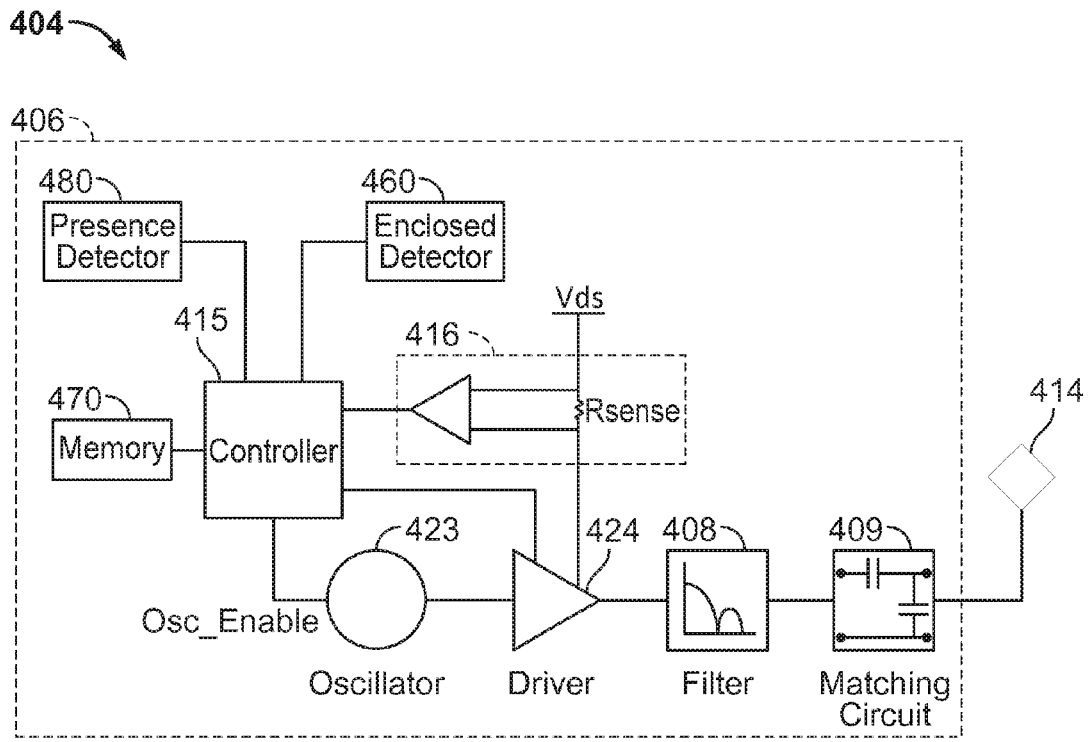
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. Transmit circuitry 406 may provide power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 (e.g., power amplifier) configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts or higher (e.g., from 10-60 Watts or even from 11-10 kWatts).

Transmit circuitry 406 may further include a controller 415 for selectively enabling the oscillator 423, for adjusting the frequency or phase of the oscillator 423, and for adjusting the output power level for implementing a communication protocol for interacting with neighboring devices through their attached receivers. The controller 415 can be operatively coupled to a memory 470. It is noted that the controller 415 may also be referred to herein as a processor. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In a one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert AC power present in a building, a DC-DC converter (not shown) to convert a DC power source to a voltage suitable for the transmitter 404, or directly from a DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404. Further, the presence detector 480 may be used to ensure that a device to be charged that is communicating with the transmitter 404 is the one that has been recently placed into the coverage area of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
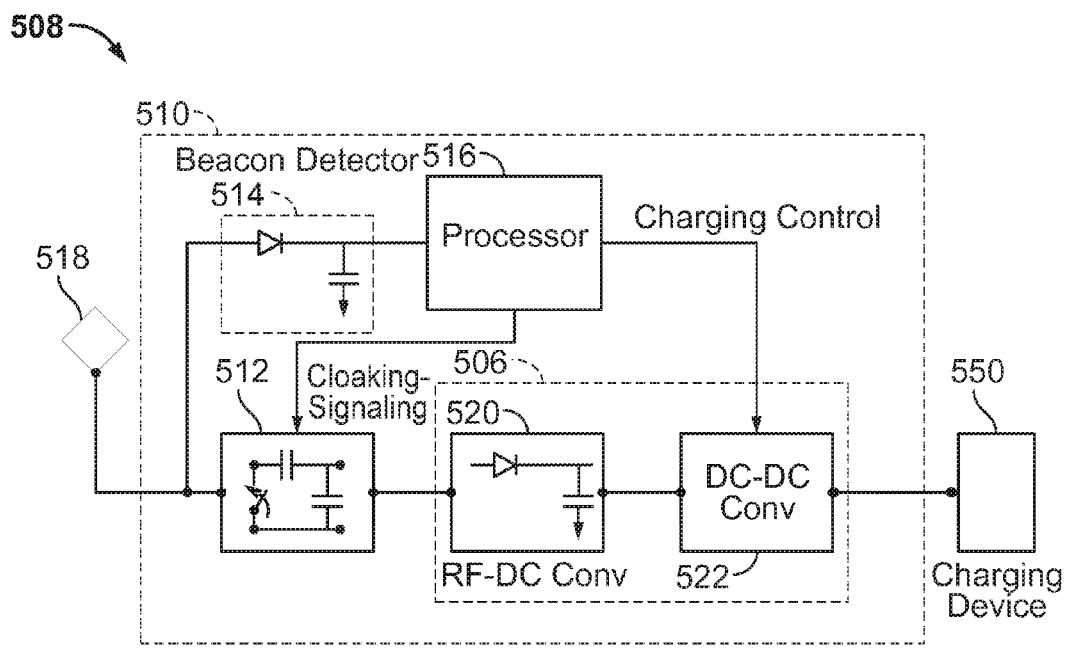
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG.

1, in accordance with exemplary embodiments of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the chargeable device may include devices such as mobile phones, portable music players, laptop computers, tablet computers, computer peripheral devices, communication devices (e.g., Bluetooth devices), digital cameras, hearing aids (and other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller than the diameter or length of transmit antenna 414. In such an example, receive antenna 518 may be implemented as a multi-turn coil in order to reduce the capacitance value of a tuning capacitor (not shown) and increase the receive antenna's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 (e.g., receiver matching and switching circuitry) for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter 404. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
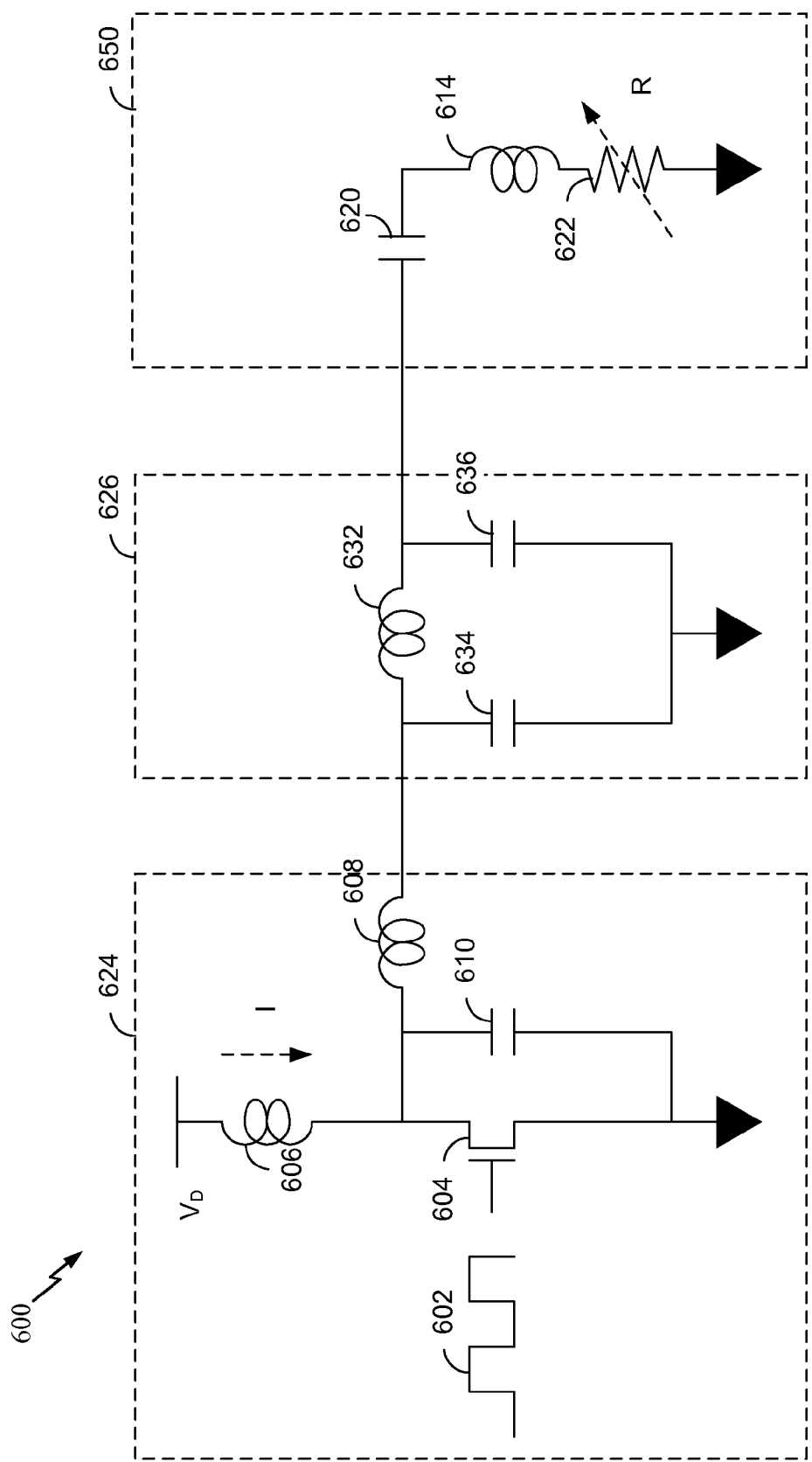
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier (e.g., comprising a transistor 604, inductors 606, 608, and a capacitor 610), however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising an antenna 614. The transmit circuit 650 may include a series resonant circuit having a capacitance 620 and inductance (e.g., that may be due to the inductance or capacitance of the antenna or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Figure 7A:
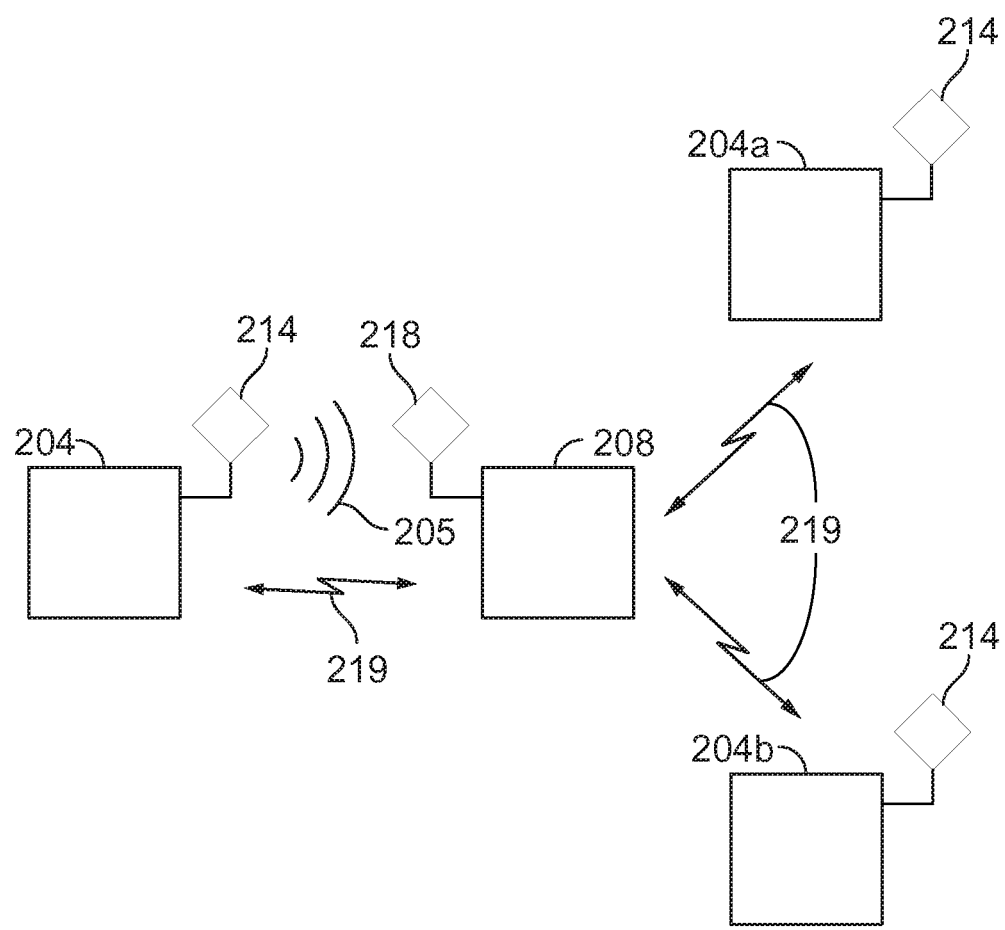
FIG. 7A is a functional block diagram of a receiver in the presence of multiple transmitters, in accordance with exemplary embodiments of the invention.

When multiple transmitters are within out-of-band communication range of a receiver, it is important to establish communications with the transmitter best suited for transferring wireless power to the receiver. Out-of-band communications between the transmitter and the receiver can be carried out over a separate communication channel from the wireless power transfer field, as described below. FIG. 7A is a functional block diagram depicting the case where a receiver 208 is located in proximity to multiple transmitters 204, 204a, and 204b. As shown, receiver 208 is located so as to receive wireless power from transmitter 204 via field 205. However, receiver 208 is capable of establishing an out-of-band communication channel 219 with transmitters 204, 204a, and 204b. Thus, if receiver 208 establishes channel 219 with transmitter 204a or 204b, any subsequent communications related to power transfer would be irrelevant. This situation may be referred to herein as a misconnection or cross connection.

Figure 7B:
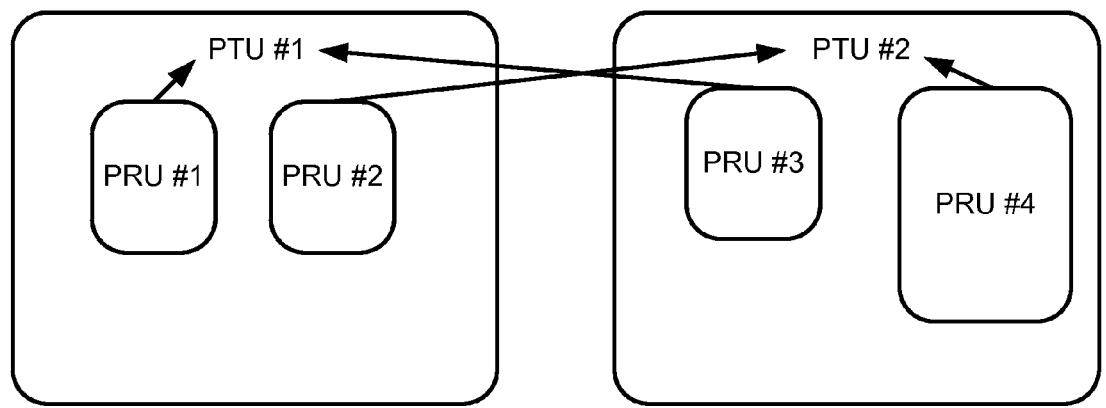
FIG. 7B schematically illustrates an example of cross connection among four receivers in the presence of two transmitters.

FIG. 7B is a block diagram of another example of cross connection in a system comprising two power transmitter units (PTU#1 and PTU#2) and four power receiver units (PRU#1, PRU#2, PRU#3, PRU#4). For example, a medium range communication system, e.g., Bluetooth Low Energy (BLE), can have a range of 10-50 meters potentially resulting in a condition in which a power receiver unit can connect to the wrong power transmitter unit. As shown in FIG. 7B, PRU#1 has correctly connected to PTU#1, and PRU#4 has correctly connected to PTU#2. However, PRU#2 has incorrectly connected (or cross connected) to non-co-located PTU#2 and PRU#3 has incorrectly connected (or cross connected) to non-co-located PTU#1. As shown in FIG. 7B, PRU#2 may have a communication connection to PTU#2 while having a wireless power connection to PTU#1, and PRU#3 may have a communication connection to PTU#1 while having a wireless power connection to PTU#2.

Wireless charging systems are expected to operate in various illustrative environments, some with multiple power transmission units and multiple power receiver units in which the problem of cross connections can arise. For example, a "solo" environment can comprise a single power transmission unit and a single power receiver unit, so no cross connection can result. As another example, a "residential" environment can comprise multiple (e.g., two) power transmission units spaced (for example, 10 meters) apart from one another and operated concurrently with one another. As another example, a "coffee shop" environment can comprise multiple (e.g., 10) power transmission units spaced (for example, 2 meters) from one another. Thus, there can be multiple power transmission units that are "visible" or detectable by most power receiver units in the vicinity, and a number (e.g., 5) of these power transmission units can be active at any given time. As another example, a "stadium" environment can comprise multiple (e.g., more than 1000) power transmission units spaced (for example, one meter) apart from one another (e.g., 1 per square meter). Thus, there can be many (e.g., 300) power transmission units "visible" or detectable by power receiver units within a distance range (for example, 10 meters).

Attempts to prevent incorrect corrections or cross connections may fail, for example, by incorrectly rejecting a co-located power receiving unit (false rejection), or by incorrectly allowing a cross-connected power receiving unit to remain connected (false acceptance). For false rejection, a chargeable device on a correct wireless charger is incorrectly rejected, and can be caused by excessive Z separation or by system instability. Potential results of such false rejections include, but are not limited to, long period of rejection (e.g., minutes) until the device is re-accepted, and system trip (e.g., shutdown of some or all functionality of the wireless charger) due to apparent measurement of the transmitter transmitting too much power without seeing a corresponding increase in received power. For false acceptance, a chargeable device on another wireless charger is incorrectly accepted by the wireless charger as its own. Such failures can be caused by good matching across wireless chargers or by coincident timing (e.g., power being restored to multiple wireless chargers at the same time).

Out-of-band communication (e.g., an advertisement) may be implemented through the use of any wireless communication protocol having a range of implementation (e.g., a proprietary communication protocol, a communication protocol established by a standards organization like IEEE, etc., IrDA, Wireless USB, Z-Wave, ZigBee, Bluetooth Low Energy (BLE), and/or the like). Having multiple power transmitting units within this range can contribute to the problem of cross connection.

Figure 7C:
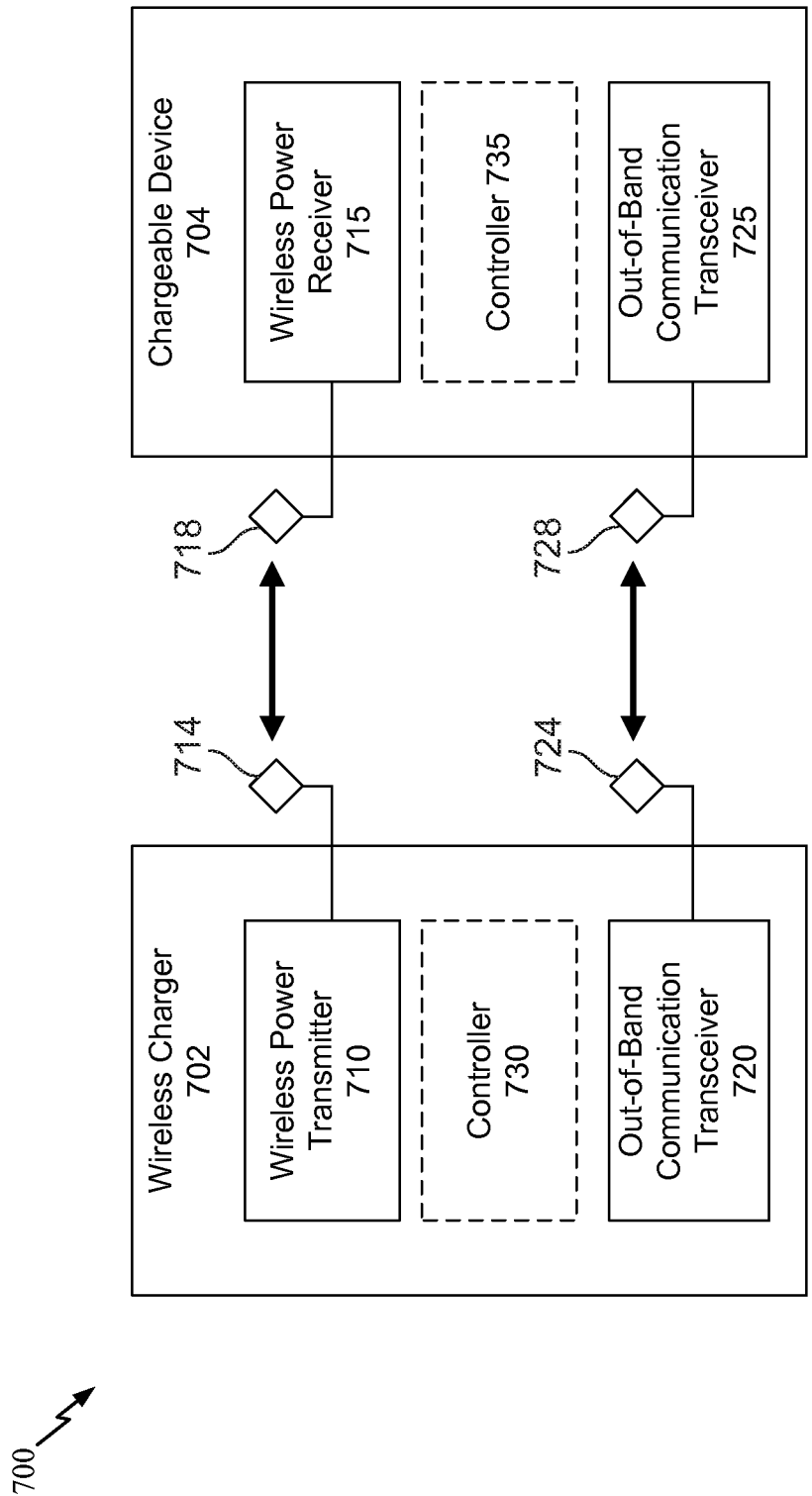
FIG. 7C is a block diagram of a wireless charging system that may incorporate the transmit circuitry of FIG. 4 and the receive circuitry of FIG. 5.

FIG. 7C is a block diagram of a wireless power system 700 capable of out-of-band communications that may incorporate the transmit circuitry 406 of FIG. 4 and the receive circuitry 510 of FIG. 5. The wireless power system 700 may comprise a wireless charger 702 (e.g., a power transmitter unit) and a chargeable device 704 (e.g., a power receiver unit).

The wireless charger 702 may comprise a wireless power antenna 714 and a wireless power transmitter 710 coupled to the wireless power antenna 714 and configured to generate a wireless charging field (e.g., a magnetic field) in at least one charging region (e.g., one, two, three, or more charging regions). The wireless charging field can comprise a plurality of power signals. The wireless charger 702 can further comprise a communication antenna 724 and a transceiver 720 (e.g., an out-of-band communication transceiver) coupled to the communication antenna 724 and configured to communicate with the chargeable device via the communication antenna 724. The wireless charger 702 can further comprise a controller 730 configured to facilitate avoidance of cross connection of the chargeable device 704 with the wireless charger 702 and at least one other wireless charger (e.g., to prevent cross connection, to reduce a probability of cross connection, to terminate a cross connection). In such cross connection, the chargeable device 704 would receive power from one of the wireless charger 702 or the at least one other wireless charger (not shown) while the chargeable device 704 is communicating with the other of the wireless charger 702 or the at least one other wireless charger (not shown).

In an embodiment, the transmit antenna 714 may be similar to the transmit antenna 414 of FIG. 4, and the wireless power transmitter 710 of the wireless charger 702 may be similar to and/or include the same functionality as the transmit circuitry 406 of FIG. 4. In an embodiment, the wireless power transmitter 710 may be configured to transmit power wirelessly to charge the chargeable device 704 (e.g., to the wireless power receiver 715 of the chargeable device 704) by generating the wireless charging field in the at least one charging region.

The chargeable device 704 may comprise a wireless power antenna 718 configured to receive power from a wireless charger (e.g., the wireless charger 702) and a wireless power receiver 715 coupled to the wireless power antenna 718. The chargeable device 704 can further comprise a communication antenna 728 and a transceiver 725 (e.g., an out-of-band communication transceiver) coupled to the communication antenna 728 and configured to communication with the wireless charger (e.g., wireless charger 702) via the communication antenna 728. The chargeable device 704 can further comprise a controller 735 configured to facilitate avoidance of cross connection of the chargeable device 704 with the wireless charger 702 and at least one other wireless charger (e.g., to prevent cross connection, to reduce a probability of cross connection, to terminate a cross connection). For example, as described in more detail below, the controller 735 can be configured to generate a load pulse configured to be received by the wireless charger (e.g., wireless charger 702).

In an embodiment, the chargeable device 704 may be similar to the chargeable device 550 of FIG. 5, and the wireless power receiver 715 may be similar to and/or include the same functionality as the receive circuitry 510 of FIG. 5. Likewise, the wireless power receiver 715 may be coupled to a receive antenna 718. The receive antenna 718 may be similar to the receive antenna 518 of FIG. 5.

As shown in FIG. 7C, the out-of-band communication transceiver 720 may be coupled to antenna 724 and the out-of-band communication transceiver 725 may be coupled to antenna 728. In an embodiment, the out-of-band communication transceivers 720 and 725, via antennas 724 and 728, may be used to establish a connection between the wireless charger 702 and the chargeable device 704 such that the chargeable device 704 can receive power wirelessly from the wireless charger 702 in order to charge its battery or similar device. The out-of-band communication (e.g., an initial notification of the placement of the device to be charged, an advertisement, or other communications relating to management of the wireless power session) may be implemented through the use of any wireless communication protocol (e.g., a proprietary communication protocol, a communication protocol established by a standards organization like IEEE, etc.). For example, IrDA, Wireless USB, Z-Wave, ZigBee, Bluetooth Low Energy (BLE), and/or the like may be used.

Figure 8:
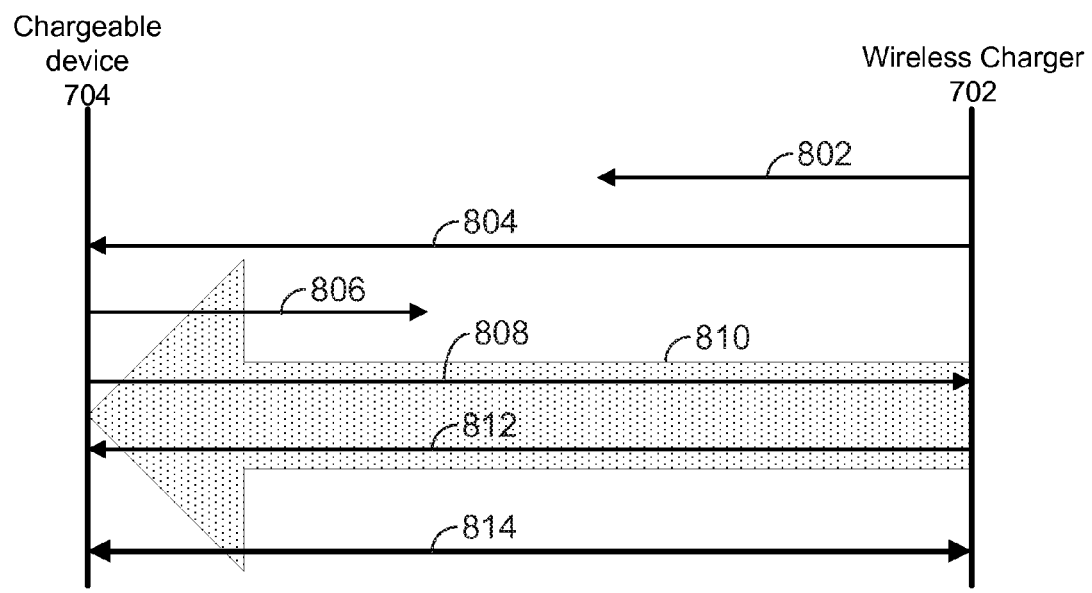
FIG. 8 is a timing and signal flow diagram of communications between a wireless charger and a chargeable device, such as the wireless charger and the chargeable device of FIG. 7A, to establish a connection between the wireless charger and the chargeable device.

To better understand the resolution techniques disclosed herein, it is helpful to understand an exemplary method for establishing an out-of-band communication channel. FIG. 8 is a timing and signal flow diagram of an example of communications between a wireless charger and a chargeable device, such as the wireless charger 702 (e.g., power transmitter unit) and the chargeable device 704 (e.g., power receiver unit), to establish a connection between the wireless charger and the chargeable device. The wireless charger 702 may transmit a power pulse 802 (e.g., a beacon signal), where the power pulse 802 can be used to supply power to a chargeable device, like chargeable device 704, to charge the chargeable device (or at least to provide a sufficient level of power such that the chargeable device 704 may power its out-of-band communication transceiver 725 for sending initialization messages to the wireless charger 702). The wireless charger 702 may transmit the power pulse 802 in order to detect a chargeable device 704. As illustrated in FIG. 8, the power pulse 802 was transmitted, but no chargeable device 704 was in range of the power pulse 802. The wireless charger 702 may wait a period of time before transmitting another power pulse 804. For example, the wireless charger 702 may wait 1 second between pulses. Upon transmitting the power pulse 802 and/or 804, the wireless charger 702 may start a general connection establishment procedure. As illustrated in FIG. 8, the power pulse 804 was transmitted and in range of the chargeable device 704.

Once the wireless charger 702 detects a load on the power pulse 804, the wireless charger 702 begins scanning for a broadcast from a device, like the chargeable device 704. In this manner, the wireless charger 702 may conserve power by only scanning for a broadcast once it detects a load on a power pulse. In an embodiment, the power pulse 804 causes the chargeable device 704 to generate a broadcast (e.g., a processor of the chargeable device 704 may generate the broadcast). As an example, the broadcast 806 may be message(s) transmitted over Bluetooth Low Energy channels. The chargeable device 704 may transmit the broadcast 806 with the wireless charger 702 as the intended recipient. If the broadcast 806 does not reach the wireless charger 702 (as depicted in FIG. 8), then the chargeable device 704 may generate and transmit another broadcast 808. For example, the chargeable device 704 may wait 20 ms before sending another broadcast 808. If a connection is not established within a certain time frame, such as 10 seconds, the chargeable device 704 may exit a connectable mode and stop any charging that may have started. In this manner, the chargeable device 704 may conserve power by only generating and transmitting a broadcast 806 and/or 808 once it receives a power pulse 802 and/or 804 from the wireless charger 702.

Note that there are numerous situations in which a misconnection (e.g., cross connection) may occur. For example, another device besides chargeable device 704, or an object in the vicinity of the wireless charger 702, may cause the wireless charger 702 to detect a load and begin scanning for a broadcast. As another example, some chargers may continually scan for a broadcast independent of the timing of power pulses 802 and 804. As yet another example, some chargeable devices may continually broadcast independent of the timing of power pulses 802 and 804. As yet another example, a wireless charger may respond to a broadcast before the charger which originated a power pulse, preempting the initialization of communications. Consequently, in these and other situations the wireless charger 702 may inadvertently establish communications with a chargeable device located outside an effective charging region, resulting in a misconnection or cross connection.

Once the wireless charger 702 receives the broadcast 808, the wireless charger may transmit a connection request 812 to the chargeable device 704. If the chargeable device 704 accepts the connection request 812, then a connection 814 is established between the wireless charger 702 and the chargeable device 704.

Note that during the connection process illustrated in FIG. 8, the wireless charger 702 may continue to transmit power 810, such as via the power pulse 802 and/or 804, in order to charge the chargeable device 704. In some aspects, the chargeable device 704 may be in a charger powered mode, and the power 810 would allow the chargeable device 704 to remain active in order to establish a connection with the wireless charger 702. Once the wireless charger 702 determines that a connection cannot be established, that the chargeable device 704 is now in a self-powered mode, and/or that the chargeable device 704 otherwise does not need the power transmitted from the wireless charger 702, then the wireless charger 702 may stop transmitting the power 810.

If a connection is lost at any point, the chargeable device 704 may attempt to reconnect with the wireless charger 702. Alternatively, the chargeable device 704 may wait until it receives another power pulse 802 and/or 804 from the wireless charger 702.

Several methods disclosed herein may be used to assist in the correct connection of out-of-band signaling between a wireless charger 702 and a chargeable device 704, and/or ascertain whether an out-of-band communication channel has been improperly established between the wireless charger 702 and the chargeable device 704 (e.g., a misconnection or a cross connection). These methods are referred to herein as resolution methods. Some of these resolution methods do not necessarily guarantee an out-of-band communication channel has been established between the optimal transmitter and receiver. Instead, some methods tend to inferentially support or undermine the propriety of the established communication channel. Accordingly, one or more of these resolutions methods may be used alone or in combination with one another in a wireless power transfer system to facilitate avoidance of cross connection (e.g., to prevent cross connection, to reduce a probability of cross connection, to terminate a cross connection). Further, the output of these resolution methods may be compared against a threshold for that particular method and/or combined with other methods disclosed herein. The outputs of these methods may be weighted and used in a probabilistic or fuzzy logic type model to evaluate whether there has been a misconnection and out-of-band communication should attempt to reconnect.

The resolution methods may be carried out by a controller (e.g., controller 415 of FIG. 4, processor 516 of FIG. 5, controllers 730, 735 of FIG. 7). In one embodiment, the resolution method(s) may be evaluated by a transmitter-side controller (e.g., wireless charger controller 730) with receiver-side measurements transmitted over the out-of-band communication channel. In another embodiment, the resolution methods may be evaluated either transmitter-side or receiver-side, with the resulting output(s) transmitted via the out-of-band communication channel to the transmitter (or receiver). Further, upon identifying a misconnection (e.g., cross connection) but before dropping the out-of-band communication channel, the local controller (e.g., controller 730 or 735) may notify the remote controller (e.g., the other of controller 730 or 735) of the misconnection. In certain embodiments, the controller (e.g., controller 730 or 735) can provide additional time to allow the connection to be made to resolve cross connections, e.g., adding to the total time between placement of the chargeable device 704 to resolving any cross connections. In particular, congested environments with many wireless chargers and many chargeable devices can take a significant amount of time to resolve any cross connections.

A "lost power" process can use power measurements (e.g., AC or DC) compared to reported power at the chargeable device 704 to calculate an amount of "lost" power, with the intent to shut down power to the wireless charger 702 when too much power is unaccounted for, thereby helping to prevent heating of metallic objects placed on the wireless charger during operation. To accurately measure lost power, an accurate count of the number of devices receiving power is desirable, but such an accurate count may not be available when cross connections occur. Thus, cross connections can result in unexpected shutdowns if a lost power algorithm is utilized, thereby degrading the user experience. By leaving "off" any chargeable devices suspected of being cross connected to multiple power chargers, the amount of power drawn by the chargeable device 704 and the odds of a power trip due to lost power are reduced. However, since the chargeable device 704 will not be charging under such circumstances, the user experience may suffer. Thus, in certain embodiments, the resolution techniques described herein can improve the user experience.

Saturation Test

In certain embodiments, a wireless power system uses a data link to control the power transmitted by the wireless charger 702 to the chargeable device 704. For example, an out-of-band communication channel as described herein with regard to FIG. 8 can be used to initiate the data link (e.g., the connection 814). The data link can be used by the chargeable device 704 to request more power from the wireless charger 702 when a voltage (e.g., a sensed output voltage of the receive circuitry 510) of the chargeable device 704 indicates that the amount of power being transferred is below a predetermined level indicative of power transfer that is too low. In addition, the data link can be used by the chargeable device 704 to request less power from the wireless charger 702 when a voltage (e.g., a sensed output voltage of the receive circuitry 510) is above a predetermined level indicative of power transfer that is too high. During normal operations, such use of the data link can be used to optimize the power transfer from the wireless charger 702 to the one or more chargeable devices 704, so that all the chargeable devices 704 receive an acceptable amount of power transfer.

However, during cross connection, the behavior of the wireless power system utilizing the data link can be nonsensical or paradoxical. For example, if a chargeable device 704 is cross connected (e.g., receiving power from one wireless charger 702 but communicating with another wireless charger 702), the chargeable device 704 will not detect a change in the transmitted power when it requests a change of transmitted power, since the request is not being communicated to the wireless charger 702 providing power to the chargeable device 704, but to another wireless charger 702. Such a cross connection condition can lead to a saturation of the power level of the wireless charger 702 receiving the requests. As such, in accordance with an aspect of an embodiment, if a controller (e.g., a controller 730 of the wireless charger 702, a controller 735 of the chargeable device 704) determines that a request for a change in power is not matched by an actual change in power, the controller may determine that a cross-connection may potentially be present. Furthermore, for example, a wireless charger 702 receiving requests for more power from a cross connected chargeable device 704 could end up being saturated at its maximum power, while the chargeable device 704 is detecting little power available (e.g., resulting in the chargeable device 704 requesting more power). Alternatively, a wireless charger 702 receiving requests for less power from a cross connected chargeable device 704 could end up being saturated at its minimum power, while the chargeable device 704 is detecting a high amount of power available (e.g., resulting in the chargeable device 704 requesting less power).

Figure 9:
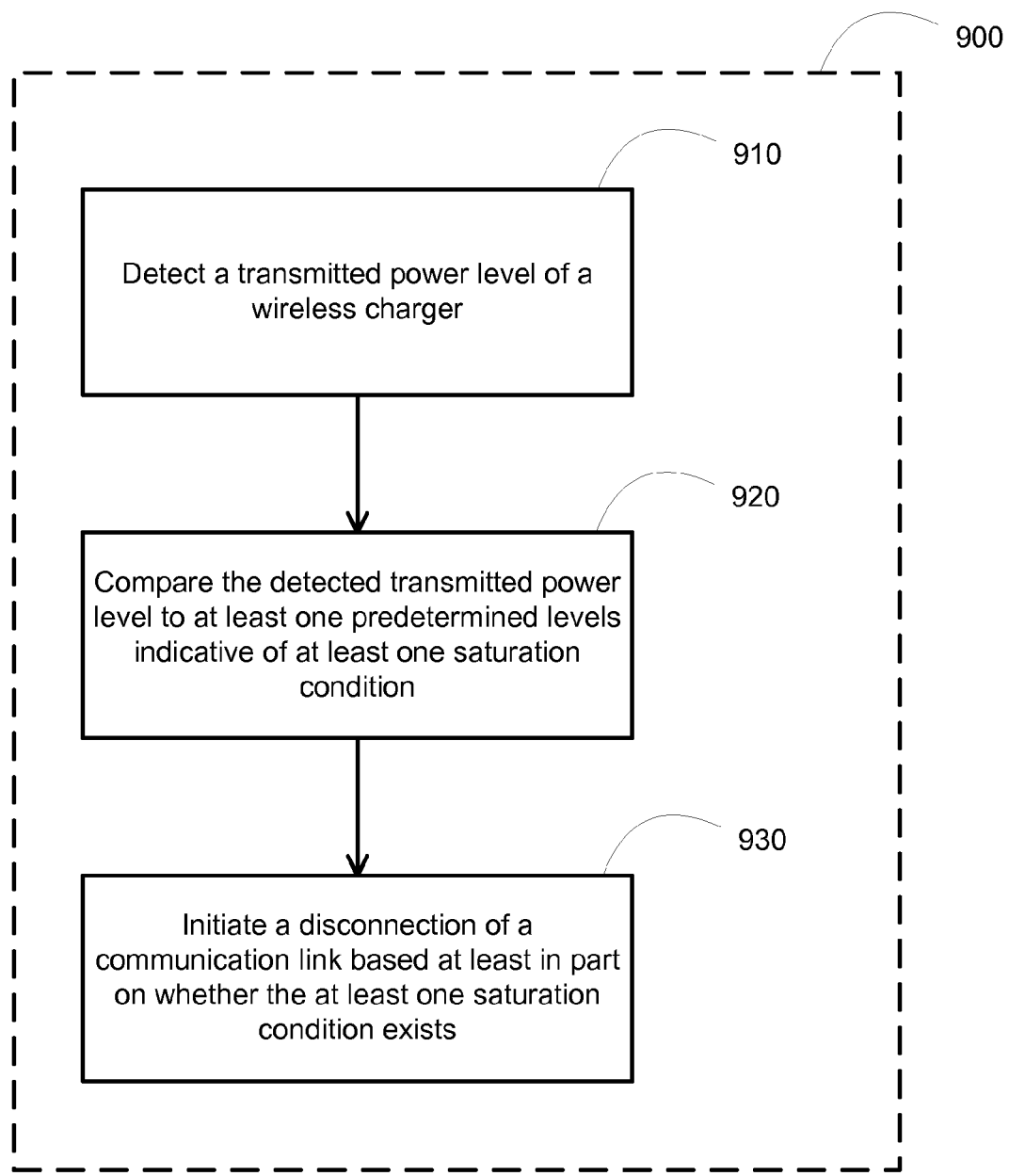
FIG. 9 is a flow diagram of an example first resolution method of facilitating avoidance of cross connection of a chargeable device in communication with a wireless charger in accordance with certain embodiments described herein.

FIG. 9 is a flow diagram of an example first resolution method 900 of facilitating avoidance of cross connection of a chargeable device 704 in communication with a wireless charger 702 in accordance with certain embodiments described herein. In an operational block 910, a transmitted power level of a wireless charger 702 is detected. In an operational block 920, the detected transmitted power level can be compared to at least one predetermined level indicative of at least one saturation condition. For example, the detected transmitted power level can be compared to a first predetermined level indicative of a maximum power saturation condition. The maximum power saturation condition may correspond to a condition in which the transmitted power is at or above a first power level. The first power level may correspond to a maximum allowable level. The maximum allowable level may be some upper limit based on one or more characteristics or protocols for operating the wireless charger 702 (e.g., based on either limits according to accommodating different types of chargeable devices or for protection of certain components of the wireless charger 702). In some cases the detected transmitted power level can be compared to a second predetermined level indicative of a minimum power saturation condition. The minimum power saturation condition may correspond to a condition in which the transmitted power is at or below a second power level. The second power level may correspond to a minimum allowable level. The minimum allowable level may be some lower limit based on one or more characteristics or protocols for operating the wireless charger 702. In an operational block 930, the wireless charger 702 can initiate (e.g., force) a disconnection of a communication link between the wireless charger 702 and the chargeable device 704 based at least in part on whether the at least one saturation condition exists, thus ending the cross connection. For example, the wireless charger 702 can initiate (e.g., force) a disconnection of the wireless charger 702 from the chargeable device 704 if the detected transmitted power level is at or above the first predetermined level or can initiate (e.g., force) a disconnection if the detected transmitted power level is at or below the second predetermined level. In certain embodiments, a request for power adjustment (e.g., a requested change of the transmitted power) from the chargeable device 704 can be detected. For example, a requested change of the transmitted power can correspond to at least one of: a request for an increased level of power when the at least one saturation condition is indicative of a maximum allowable transmitter power level; or a request for a decreased level of power when the at least one saturation condition is indicative of a minimum allowable transmitter power level. The request for power adjustment can be compared to the at least one predetermined level, and a disconnection of the wireless charger 702 from the chargeable device 704 can be initiated based on this comparison (e.g., based on whether the requested power adjustment would place the transmitted power level above a maximum power saturation condition or below a minimum power saturation condition).

In certain embodiments, detecting the transmitted power level, comparing the detected transmitted power level, and initiating the disconnection are performed by the wireless charger 702 (e.g., by a controller of the wireless charger 702). In other certain embodiments, detecting the transmitted power level, comparing the detected transmitted power level, and initiating the disconnection are performed by the chargeable device 704 (e.g., by a controller 735 of the chargeable device 704). In still other certain embodiments, at least one of detecting the transmitted power level, comparing the detected transmitted power level, and initiating the disconnection is performed by the wireless charger 702 (e.g., by a controller 730 of the wireless charger 702) and at least one other of detecting the transmitted power level, comparing the detected transmitted power level, and initiating the disconnection is performed by the chargeable device 704 (e.g., by a controller of the chargeable device 704).

In certain embodiments, to avoid disconnecting during inadvertent transient changes in power, the wireless charger 702 does not initiate the disconnection until the saturation condition persists for a predetermined amount of time (e.g., one second, two seconds, or more). For example, the wireless power system 700 (e.g., a controller of the wireless charger 702; a controller of the chargeable device 704) can be configured to detect whether the at least one saturation condition exists for the predetermined period of time, and to perform initiating the disconnection after detecting that the at least one saturation condition persists for the predetermined period of time.

In certain embodiments, the wireless power system 700 (e.g., a controller 730 of the wireless charger 702; a controller 735 of the chargeable device 704) is configured to distinguish between a cross connection condition and non-cross connection conditions in which the at least one saturation condition exists, and is configured to not initiate a disconnection if a non-cross connection condition exists. For example, the wireless power system 700 (e.g., a controller 730 of the wireless charger 702; a controller 735 of the chargeable device 704) can be configured to detect a condition in which the wireless charger 702 and the chargeable device 704 are separated by a finite distance (e.g., by a pad of paper sandwiched between the wireless charger 702 and the chargeable device 704) and/or a condition in which the power requested by the chargeable device 704 exceeds the maximum power the wireless charger 702 can provide. Due to such separation or such excessive power requests, the wireless charger 702 may be saturated at maximum power while the chargeable device 704 is at a relatively low power, even though there is no cross connection. Such a case can be detected since the voltage of the chargeable device 704 will still rise as the wireless charger 702 increases power due to requests for increased power from the chargeable device 704, although the voltage of the chargeable device 704 may not achieve an adequate, desired, or ideal level.

In certain embodiments, the wireless charger 702 can make a further determination as to whether a chargeable device 704 is cross-connected by causing an intentional and predetermined magnitude change of the transmitted power from the wireless charger 702 for a predetermined period of time. This intentional and predetermined magnitude change for the predetermined period of time can be requested by the wireless charger 702 or by the chargeable device 704 (e.g., by the controller 730 of the wireless charger 702; by the controller 735 of the chargeable device 704), and can be performed by the wireless charger 702 (e.g., by the controller of the wireless charger 702). For example, if a chargeable device 704 is suspected of being cross-connected due to the above saturation test of operational block 920 (or due to other tests described herein), then the wireless charger 702 can intentionally perform a transient change in the transmitted power and the wireless power system 700 (e.g., a controller 730 of the wireless charger 702; a controller 735 of the chargeable device 704) can compare the detected change of the detected transmitted power to the magnitude of the intentional change to determine whether the chargeable device 704 detects this intentional change in the transmitted power. If the chargeable device 704 does detect this intentional change in the transmitted power, it is very likely that the chargeable device 704 is in communication with the wireless charger 702 (e.g., the chargeable device 704 is positioned on the wireless charger 702) and that the chargeable device 704 is not experiencing cross connection. Likewise, if the chargeable device 704 does not detect the intentional change in the transmitted power (e.g., detects no change or detects a change that differs by at least a predetermined amount from the change), it is very likely that the chargeable device 704 is not in communication with the wireless charger 702 (e.g., the chargeable device 704 is not positioned on the wireless charger 702) and the chargeable device 704 may be experiencing cross connection.

The wireless power system 700 (e.g., a controller 730 of the wireless charger 702; a controller 735 of the chargeable device 704) can, in certain embodiments, make intelligent decisions about how to select (e.g., tailor) the predetermined magnitude and the period of time of the change of the transmitted power to avoid adversely affecting the transfer of power from the wireless charger 702 to chargeable devices 704 properly connected to the wireless charger 702. For example, if a wireless charger 702 has three chargeable devices 704 within its charge area, and two of these chargeable devices 704 are properly connected to the wireless charger 702 and charging, but a third chargeable device 704 is suspected of being cross connected, the wireless charger 702 can selectively alter the transmitted power (e.g., to increase the transmitted power or to decrease the transmitted power) so that the two chargeable devices 704 that are operating correctly are not adversely affected. In the above example, if the two chargeable devices 704 were reporting that they were receiving power that resulted in a voltage that was barely sufficient to charge, the wireless charger 702 could increase the transmitted power transiently (e.g., for a predetermined period of time). If the two chargeable devices 704 were reporting that they were near their maximum voltage limit, then the wireless charger 702 could decrease the transmitted power transiently (e.g., for a predetermined period of time). If the two chargeable devices 704 were reporting that they were near their maximum and minimum voltage limits respectively, the wireless charger 702 could elect to not make a transient change in the transmitted power, so as to avoid interrupting power to either of the two connected chargeable devices 704. In certain such embodiments, the wireless charger 702 could rely on other tests as described herein.

Randomized Transmitter Turn-on

Under certain circumstances, during initial turn-on of the wireless power system 700, multiple wireless chargers 702 may turn on at or near the same time as one another, with multiple chargeable devices 704 in proximity to the wireless chargers 702 (e.g., each chargeable device 704 positioned on one of the wireless chargers 702), ready to be charged. For example, an initial power-on of a branch circuit supplying the multiple wireless chargers 702 with power could cause this condition to occur. If all the wireless chargers 702 are turned on at or near the same time, then the multiple chargeable devices 704 will detect power being applied at or near the same time, resulting in the multiple chargeable devices 704 potentially all trying to connect to a corresponding wireless charger 702 at or near the same time. During such a case, a wireless charger 702 may have difficulty determining which chargeable device 704 is within its own charging area.

Figure 10:
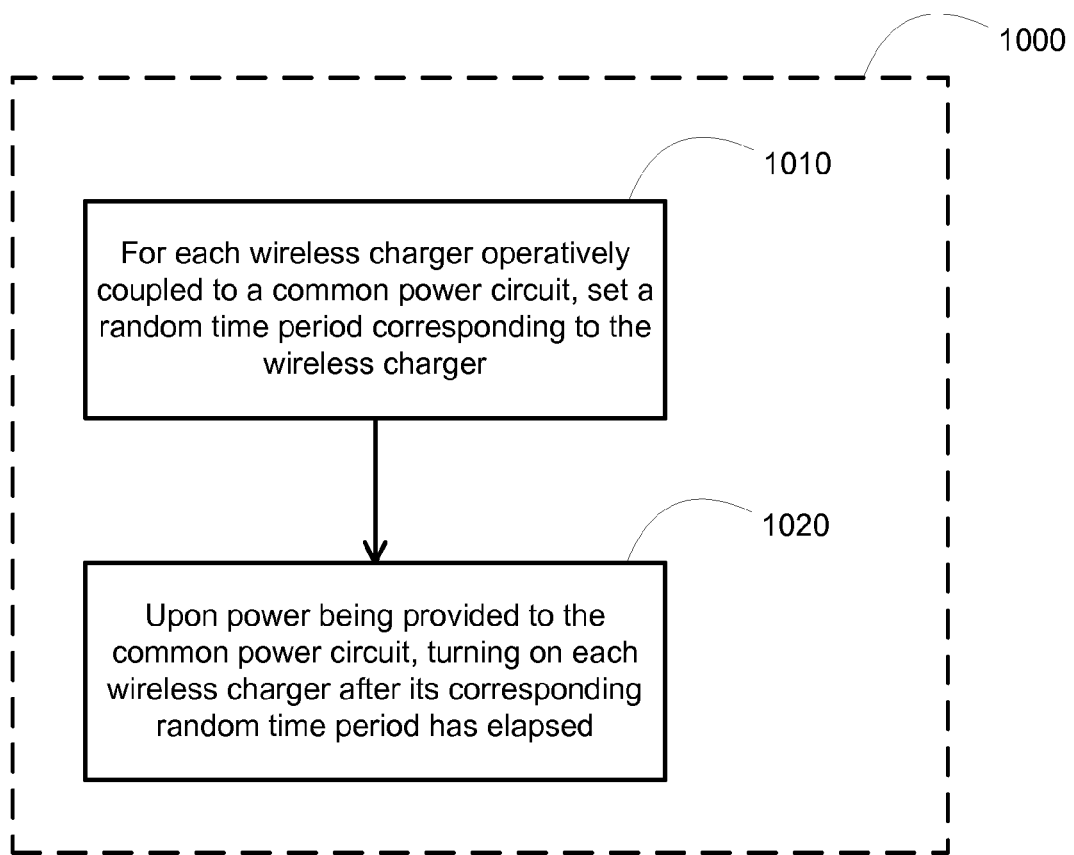
FIG. 10 is a flow diagram of an example of a second resolution method of facilitating avoidance of cross connection of a chargeable device in communication with a wireless charger in accordance with certain embodiments described herein.

FIG. 10 is a flow diagram of an example of a second resolution method 1000 of facilitating avoidance of cross connection of a chargeable device 704 in communication with a wireless charger 702 in accordance with certain embodiments described herein. In an operational block 1010 of the method 1000, for each wireless charger 702 of a plurality of wireless chargers 702 operatively coupled to a common power circuit (e.g., a common branch circuit), a time period between (i) power being provided to the wireless charger 702 via the common power circuit and (ii) the wireless charger 702 being turned on (e.g., wirelessly transferring power to one or more chargeable devices 704) is set to a random value for the wireless charger 702. This operational block 1010 can be referred to as randomizing the turn-on timing of the wireless chargers 702. The random value can be selected by a controller 730 of the wireless charger 702 and can be selected from a predetermined range of values (e.g., between zero and one second). While the example method 1000 of FIG. 10 is described in conjunction with an example configuration having a plurality of wireless chargers 702 operatively coupled to a common power circuit, certain other embodiments described herein are utilized with other configurations that are not constrained in this manner. In an operational block 1020 of the method 1000, upon power being provided to the common power circuit, each wireless charger 702 of the plurality of the wireless chargers 702 is turned on after its corresponding random time period has elapsed.

By randomizing the turn-on timing of the wireless chargers 702 as described above, the chargeable devices 704 will not all attempt to connect their data links to the wireless chargers 702 at or near the same time. For example, in certain embodiments, in accordance with FIG. 8, since the chargeable device 704 sends a connection request broadcast 808 subsequent to receiving a power pulse 804, the random turn-on times will cause variation in when the chargeable devices 704 attempt to connect their data links. Random turn-on timing increases the odds that a given wireless charger 702 will power up at a moment in time that is unique to the wireless charger 702, and thus the one or more chargeable devices 704 within the charging area of the wireless charger 702 will attempt to connect at a unique moment of time. By detecting only those chargeable devices 704 within its charging area that are attempting to connect after the wireless charger 702 applies power, the incidence of cross connection can be greatly reduced.

Available Charge Area Versus Size of Chargeable Device

A wireless charger 702 can have or define a charging region in which it can effectively transfer power to one or more chargeable devices 704, and each chargeable device 704 can have a corresponding size. The charging region can have a predetermined charging area, and as each chargeable device 704 is placed within the charging area of the wireless charger 702, the amount of the charging area that is free to accept additional chargeable devices 704 decreases, until the charging area can no longer reasonably accommodate additional chargeable devices 704. Thus, the charging area can only reasonably accommodate a finite number of chargeable devices 704 concurrently. If the amount of the charging area of a first wireless charger 702 that is free to accept additional chargeable devices 704 is less than the area of an additional chargeable device 704 (e.g., the finite number of chargeable devices 704 is already connected to the first wireless charger 702), and an additional chargeable device 704 attempts to connect to the first wireless charger 702, then this additional chargeable device 704 can be considered to have a high probability that it is actually positioned on another second wireless charger 702, such that its connection to the first wireless charger 702 would result in a cross-connection condition.

Figure 11:
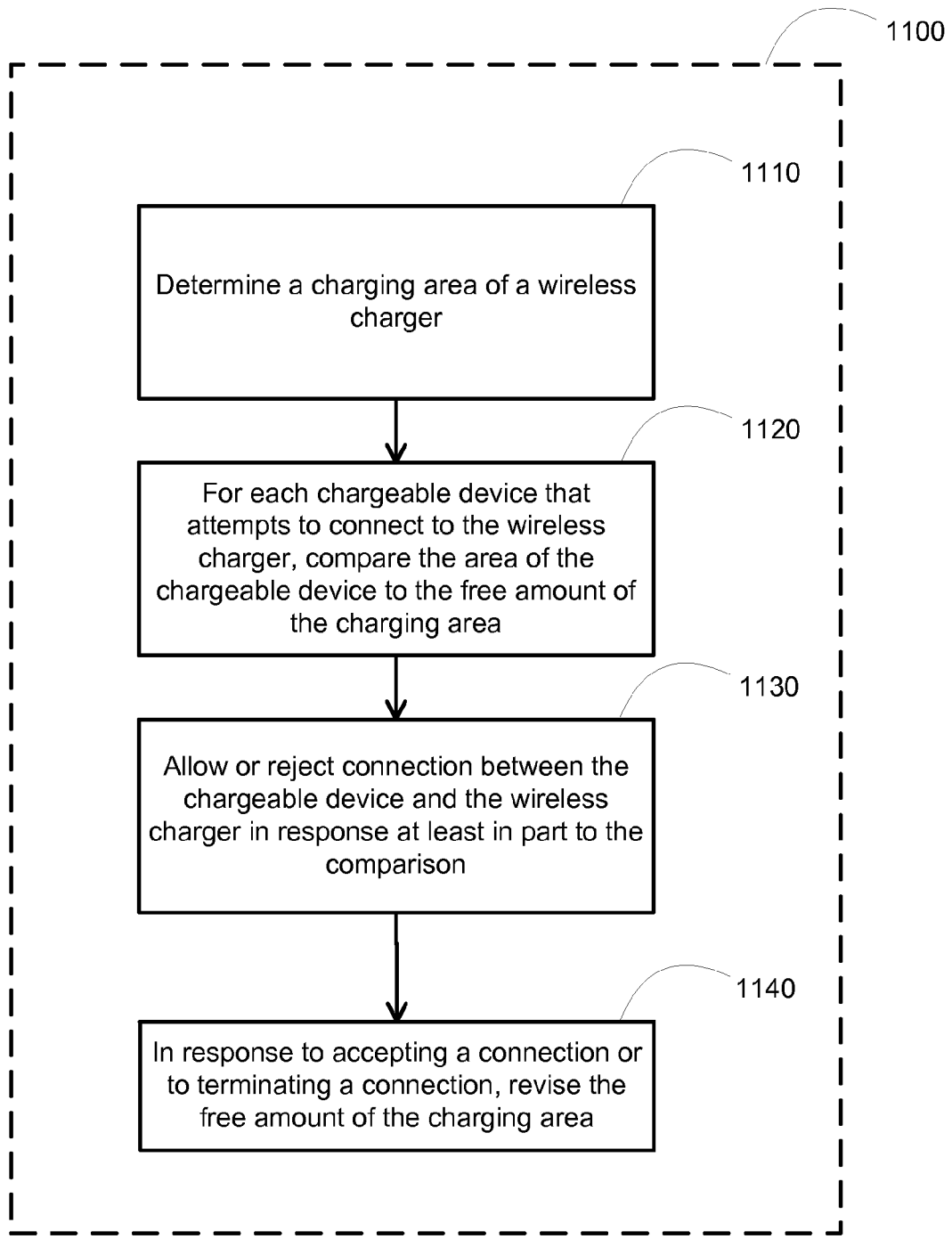
FIG. 11 is a flow diagram of an example of a third resolution method of facilitating avoidance of cross connection of a chargeable device in communication with a wireless charger in accordance with certain embodiments described herein.

FIG. 11 is a flow diagram of an example of a third resolution method 1100 of facilitating avoidance of cross connection of a chargeable device 704 in communication with a wireless charger 702 in accordance with certain embodiments described herein. In an operational block 1110, a charging area of a wireless charger 702 is determined. For example, a controller 730 of the wireless charger 702 can have access to a memory (not shown) that specifies the charging area of the wireless charger 702. In an operational block 1120, for each chargeable device 704 that attempts to connect to the wireless charger 702, the area of the chargeable device 704 can be compared to the free amount of the charging area (e.g., the amount of the charging area that is free to accept the chargeable device 704). For example, upon receiving a request from a chargeable device 704 to connect to the wireless charger 702, the controller 730 can compare the area of the chargeable device 704 to the amount of the charging area that is free to accept the chargeable device 704.

In an operational block 1130, the connection between the chargeable device 704 and the wireless charger 702 can be accepted or rejected in response at least in part to the comparison. For example, if the area of the chargeable device 704 is less than or equal to the amount of the charging area that is free to accept the chargeable device 704, then the controller 730 can allow the chargeable device 704 to connect to the wireless charger 702. For another example, if the area of the chargeable device 704 is greater than the amount of the charging area that is free to accept the chargeable device 704, then the controller 730 can reject (e.g., refuse to allow) the chargeable device 704 to connect to the wireless charger 702 or complete other operations or tests to determine whether there is a cross-connection issue. In an operational block 1140, in response to accepting a connection between a chargeable device 704 and the wireless charger 702 or in response to termination of a connection between a chargeable device 704 and the wireless charger 702, the amount of the charging area that is free to accept a chargeable device 704 can be revised. For example, in response to accepting a connection between a chargeable device 704 and the wireless charger 702, the controller 730 can recalculate the amount of the charging area that is free to accept a chargeable device 704 by subtracting the area of the chargeable device 704 from the previous value of the free amount of the charging area. For another example, in response to terminating a connection between a chargeable device 704 and the wireless charger 702, the controller 730 can recalculate the amount of the charging area that is free to accept a chargeable device 704 by adding the area of the chargeable device 704 from the previous value of the free amount of the charging area. Charging area may not be added if there is some level of uncertainty over whether the device is cross-connected, based on measurements of other parameters, as specified herein.

Time Windows on Data Connection

When power is first applied to a wireless charger 702, a chargeable device 704 that detects power from the wireless charger 702 can take some amount of time (e.g., 50 ms) to start up and enable the data connection between the chargeable device 704 and the wireless charger 702 (for example, particularly in scenarios where a battery of the chargeable device 704 is completely depleted). A chargeable device 704 that is being powered from a battery can also intentionally wait some amount of time from the moment that it first detects power from a wireless charger 702 to the moment the chargeable device 704 enables its data connection (e.g., 50 ms) with the wireless charger 702. In both cases, the chargeable device 704 can be configured to enable its data connection to a wireless charger 702 within a predetermined maximum time period (e.g., 70 ms). Thus, in certain circumstances, there can be a time window (e.g., between 50 ms and 70 ms) during which a chargeable device 704 positioned within a charging region of a wireless charger 702 (e.g., positioned on a charging pad) will enable the data connection between the chargeable device 704 and the wireless charger 702 after power is applied to the wireless charger 702. The wireless charger 702 can utilize this time window as an acceptance time window by accepting data connections that are requested within the time window and by rejecting data connections that are requested outside this time window. Chargeable devices 704 that are requesting data connections outside the acceptance time window of a wireless charger 702 can be assumed to be detecting power from a different wireless charger 702, and such data connections can be rejected to avoid cross connection.

Figure 12:
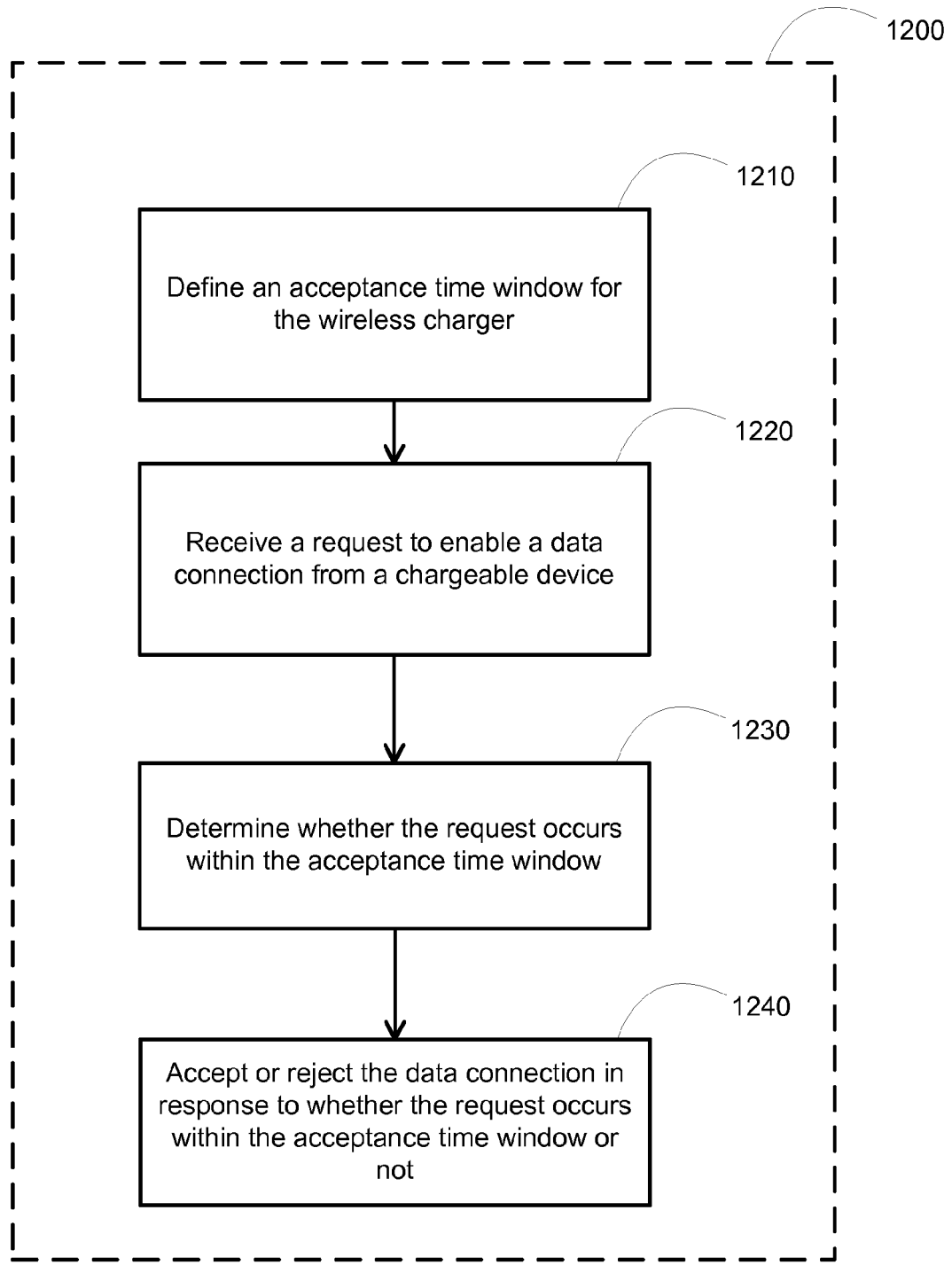
FIG. 12 is a flow diagram of an example of a fourth resolution method of facilitating avoidance of cross connection of a chargeable device in communication with a wireless charger in accordance with certain embodiments described herein.

FIG. 12 is a flow diagram of an example of a fourth resolution method 1200 of facilitating avoidance of cross connection of a chargeable device 704 in communication with a wireless charger 702 in accordance with certain embodiments described herein. In an operational block 1210, an acceptance time window is defined for the wireless charger 702. For example, a controller 730 of the wireless charger 702 can have access to a memory (not shown) that specifies the acceptance time window of the wireless charger 702. The acceptance time window can occur after a chargeable device 704 positioned within a charging region of the wireless charger 702 detects power from the wireless charger 702. The acceptance time window can have a first endpoint at a first predetermined amount of time after power is applied to the wireless charger 702 and a second endpoint at a second predetermined amount of time after power is applied to the wireless charger 702. For example, the first predetermined amount of time can correspond to a minimum expected delay between detecting power from the wireless charger 702 and enabling a data connection between the chargeable device 704 and the wireless charger 702 (e.g., 50 ms). In certain embodiments, the expected delay may start from a point when the wireless charger 702 transmits a power pulse 804 as described above with reference to FIG. 8. In other embodiments, the expected delay may start from some other period, such as, for example when the wireless charger 702 detects an indication (e.g., a change in impedance or other characteristic) that a chargeable device 704 may have been positioned within a charging area of the wireless charger 702 as is further described below. The second predetermined amount of time can correspond to a maximum expected delay between detecting power from the wireless charger 702 and enabling a data connection between the chargeable device 704 and the wireless charger 702 (e.g., 70 ms). In an operational block 1220, the wireless charger 702 receives a request to enable a data connection from a chargeable device 704. In an operational block 1230, the wireless charger 702 determines whether the request occurs within the acceptance time window. For example, upon receiving a request from a chargeable device 704 to connect to the wireless charger 702, the controller 730 can compare the timing of the request to the acceptance time window. In an operational block 1240, the data connection can be accepted or rejected in response to whether the request occurs within the acceptance time window or not. For example, if the request occurs during the acceptance time window, the data connection can be accepted, and if the request does not occur during the acceptance time window, the data connection can be rejected.

Time Windows on Data Connection with Device Detection

In certain embodiments, the wireless charger 702 can comprise a sensor or other means for detecting whether a chargeable device 704 has been positioned within the charging region of the wireless charger 702. For example, the wireless charger 702 can comprise a sensor configured to detect changes of the transmit resonator impedance (for example, the load sensing circuit 416 of FIG. 4 may be configured to detect similar changes in certain embodiments). The wireless charger 702 may detect a questionable indication that a chargeable device 704 has been placed in the charging region. For example, a detected impedance shift may be smaller than the impedance shift expected to occur from a chargeable device 704 being placed in the charging region. In certain embodiments, in response to the questionable indication, the wireless charger 702 can delay the acceptance time window further back in time. For example, for an unquestionable indication (e.g., an impedance shift greater than or equal to a predetermined value), the acceptance time window may be 50 ms-70 ms, but for a questionable indication (e.g., an impedance shift less than the predetermined value), the acceptance time window may be delayed (e.g., shifted) to 950 ms-970 ms (e.g., the time window in which the wireless charger 702 accepts a request for establishing communications from the chargeable device 704). Certain such embodiments advantageously reduce cross connections by allowing a wireless charger 702 that detects an unquestionable indication of placement of a chargeable device 704 in its charging region to attempt to connect before another wireless charger 702 that detects a questionable indication of placement of the chargeable device 704 in its charging region, thereby improving the probability that the correct wireless charger 702 will connect to the chargeable device 704 during the earlier acceptance time window.

Figure 13:
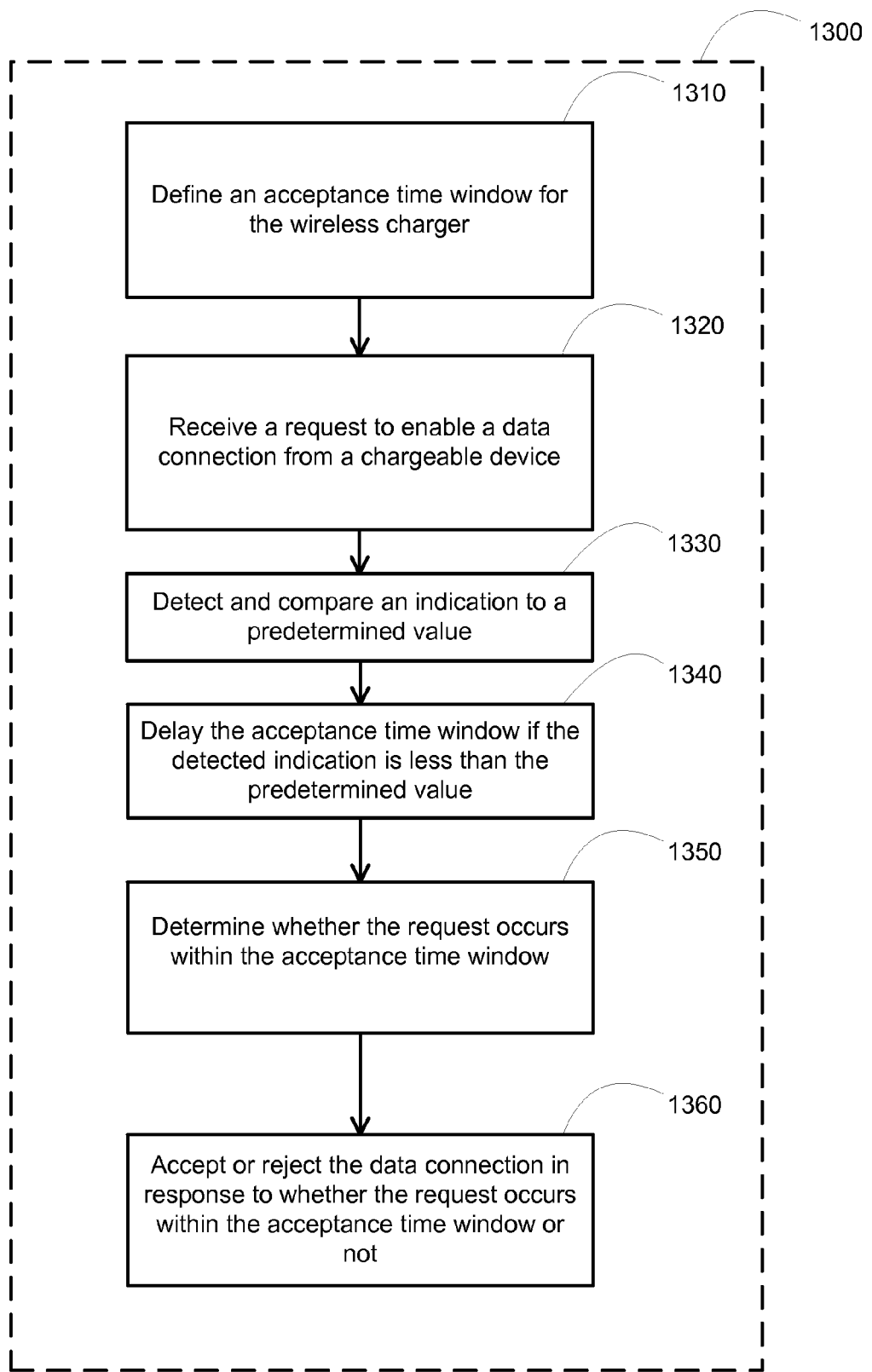
FIG. 13 is a flow diagram of an example of a fifth resolution method of facilitating avoidance of cross connection of a chargeable device in communication with a wireless charger in accordance with certain embodiments described herein.

FIG. 13 is a flow diagram of an example of a fifth resolution method 1300 of facilitating avoidance of cross connection of a chargeable device 704 in communication with a wireless charger 702 in accordance with certain embodiments described herein. In an operational block 1310, an acceptance time window is defined for the wireless charger 702. The acceptance time window can occur after a chargeable device 704 positioned within a charging region of the wireless charger 702 detects power from the wireless charger 702. The acceptance time window can have a first endpoint at a first predetermined amount of time after power is applied to the wireless charger 702 and a second endpoint at a second predetermined amount of time after power is applied to the wireless charger 702. For example, the first predetermined amount of time can correspond to a minimum expected delay between detecting power from the wireless charger 702 and enabling a data connection between the chargeable device 704 and the wireless charger 702 (e.g., 50 ms), and the second predetermined amount of time can correspond to a maximum expected delay between detecting power from the wireless charger 702 and enabling a data connection between the chargeable device 704 and the wireless charger 702 (e.g., 70 ms). In an operational block 1320, the wireless charger 702 receives a request to enable a data connection from a chargeable device 704.

In an operational block 1330, the wireless charger 702 detects an indication (e.g., an impedance shift of a transmit resonator impedance) of whether the chargeable device 704 is within the charging region of the wireless charger 702 and compares the indication to a predetermined value (e.g., a minimum impedance shift of the transmit resonator impedance that is indicative of the chargeable device 704 being within the charging region of the wireless charger 702). In an operational block 1340, the acceptance time window is delayed (e.g., shifted) by a predetermined amount of time (e.g., 900 ms) if the detected indication is inconclusive regarding whether the chargeable device 704 is within the charging region of the wireless charger 702 (e.g., the detected impedance shift is less than the predetermined minimum impedance shift that is indicative of the chargeable device 704 being within the charging region of the wireless charger 702). In certain embodiments, the detection of the indication of whether the chargeable device 704 is within the charging region may occur before the request to enable a data connection is received by the wireless charger 702.

In an operational block 1350, the wireless charger 702 determines whether the request occurs within the acceptance time window. In an operational block 1360, the data connection can be accepted or rejected in response to whether the request occurs within the acceptance time window or not. For example, if the request occurs during the acceptance time window, the data connection can be accepted, and if the request does not occur during the acceptance time window, the data connection can be rejected.

Delay or Rejection of Later Chargeable Devices

In certain embodiments (e.g., in which only one chargeable device 704 is present), the first attempt to create a data connection will be the most valid attempt. For example, the first attempt by a chargeable device 704 within the charging region (e.g., on the pad) of a wireless charger 702 will be an attempt to enable a data connection with the wireless charger 702. In certain embodiments, the wireless charger 702 can accept the data connection to the first chargeable device 704 attempting to enable a data connection with the wireless charger 702. The wireless charger 702 can then either subsequently accept data connections from other chargeable devices 704 (e.g., after a predetermined time delay) or can reject data connections from other chargeable devices 704. For example, for a wireless charger 702 configured to transfer power to multiple chargeable devices 704 concurrently, the wireless charger 702 can accept these subsequent data connection requests after a predetermined time delay. For another example, for a wireless charger 702 configured to transfer power to a single chargeable device 704 at a time, the wireless charger 702 can reject these subsequent data connection requests. Certain such embodiments can improve the probability that the connection will be correct and not a cross connection condition.

Figure 14:
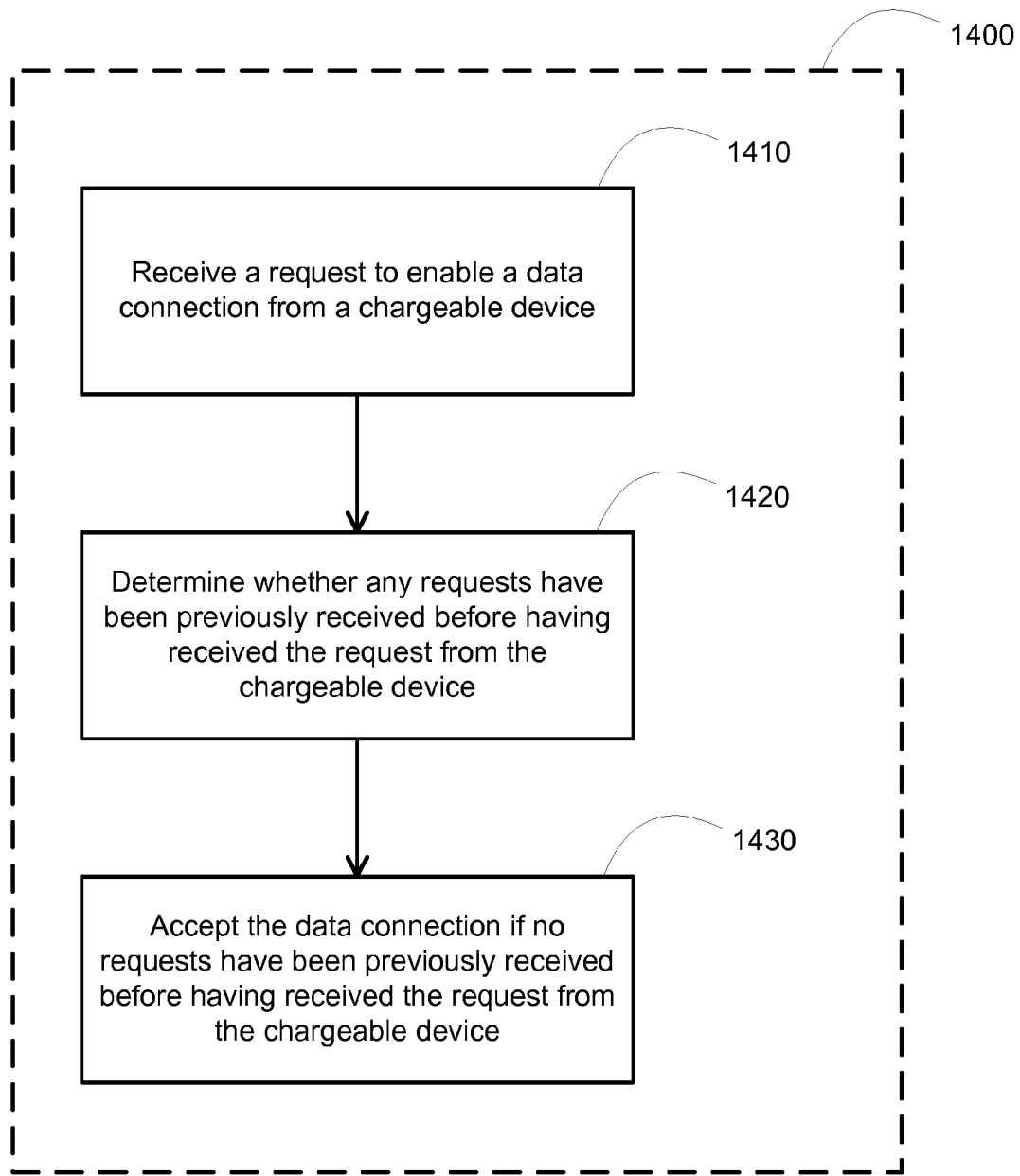
FIG. 14 is a flow diagram of an example of a sixth resolution method of facilitating avoidance of cross connection of a chargeable device in communication with a wireless charger in accordance with certain embodiments described herein.

FIG. 14 is a flow diagram of an example of a sixth resolution method 1400 of facilitating avoidance of cross connection of a chargeable device 704 in communication with a wireless charger 702 in accordance with certain embodiments described herein. In an operational block 1410, the wireless charger 702 receives a request to enable a data connection from a chargeable device 704. In an operational block 1420, the wireless charger 702 determines whether any requests have been previously received before having received the request from the chargeable device 704 (e.g., whether the received request is the first request received by the wireless charger 702). In an operational block 1430, the wireless charger 702 accepts the data connection if no requests have been previously received before having received the request from the chargeable device 704 (e.g., the received request is the first request received by the wireless charger 702). If the wireless charger 702 is configured to transfer power to only a single chargeable device 704 at a time, the wireless charger 702 can reject subsequent data connection requests.

Delay or Rejection of Weaker Chargeable Devices

In certain embodiments, the chargeable device 704 having the strongest data signal detected by the wireless charger 702 will be the chargeable device 704 within the charging region (e.g., on the pad) of the wireless charger 702. The wireless charger 702 can accept a data connection from the chargeable device 704 with the strongest data signal and can delay acceptance or can reject data connections from chargeable devices 704 having weaker data signals. The strength of the data signal from a chargeable device 704 can be measured the first time the data signal is detected (e.g., based on a measurement of an instantaneous data signal strength from the chargeable device 704) or can be measured after a short, predetermined period of time after the data signal is detected (e.g., based on a measurement of an average data signal strength from the chargeable device 704). Using an average data signal strength can tend to negate the effects of jamming or outside interference. The acceptance of the strongest data signal can improve the probability that the connection will be correct and not a cross connection condition.

Figure 15:
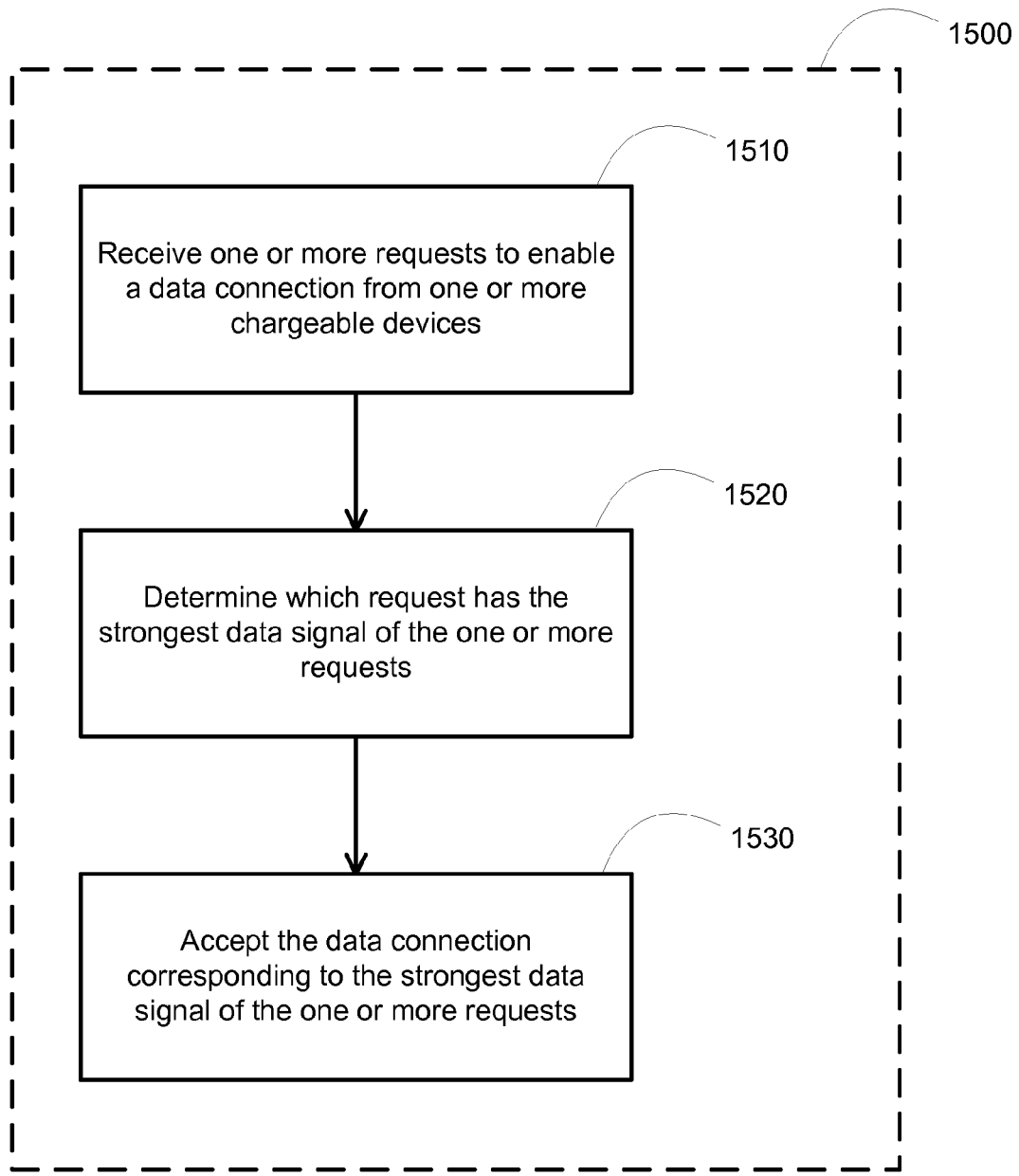
FIG. 15 is a flow diagram of an example of a seventh resolution method of facilitating avoidance of cross connection of a chargeable device in communication with a wireless charger in accordance with certain embodiments described herein.

FIG. 15 is a flow diagram of an example of a seventh resolution method 1500 of facilitating avoidance of cross connection of a chargeable device 704 in communication with a wireless charger 702 in accordance with certain embodiments described herein. In an operational block 1510, the wireless charger 702 receives one or more requests to enable a data connection from one or more chargeable devices 704. In an operational block 1520, the wireless charger 702 determines which request has the strongest data signal of the one or more requests. In an operational block 1530, the wireless charger 702 accepts the data connection corresponding to the strongest data signal of the one or more requests. For requests that do not have the strongest data signal, the wireless charger 702 can delay acceptance or can reject the data connection.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless charger for wirelessly charging a chargeable device, the wireless charger comprising:
a wireless power transmitter configured to generate a wireless charging field in at least one charging region;
a transceiver configured to communicate with the chargeable device; and
a controller configured to facilitate avoidance of cross connection of the chargeable device with the wireless charger and at least one other wireless charger by initiating a disconnection of a communication link between the wireless charger and the chargeable device based at least in part on a comparison of a detected transmitted power level of the wireless power transmitter to at least one predetermined level indicative of at least one saturation condition.

2. The wireless charger of claim 1, wherein said initiating the disconnection is further based at least in part on a comparison of the detected transmitted power level to a requested change of the transmitted power.

3. The wireless charger of claim 2, wherein the requested change of the transmitted power corresponds to at least one of: a request for an increased level of power when the at least one saturation condition is indicative of a maximum allowable transmitter power level; or a request for a decreased level of power when the at least one saturation condition is indicative of a minimum allowable transmitter power level.

4. The wireless charger of claim 1, wherein the controller is further configured to detect the transmitted power level and to compare the detected transmitted power level to the at least one predetermined level indicative of the at least one saturation condition.

5. The wireless charger of claim 1, wherein the at least one predetermined level comprises at least one of a first predetermined level indicative of a maximum power saturation condition or a second predetermined level indicative of a minimum power saturation condition.

6. The wireless charger of claim 1, wherein the controller is further configured to detect whether the at least one saturation condition exists, and to initiate the disconnection after detecting that the at least one saturation condition exists.

7. The wireless charger of claim 6, wherein the controller is further configured to initiate the disconnection after detecting that the at least one saturation condition persists for a predetermined period of time.

8. The wireless charger of claim 7, wherein the controller is further configured to distinguish between a cross connection condition and a non-cross connection condition in which the at least one saturation condition exists and the controller is further configured to not initiate a disconnection of the wireless transmitter from the chargeable device if the non-cross connection condition exists.

9. The wireless charger of claim 1, wherein the at least one predetermined level comprises at least one of a first predetermined level indicative of a maximum power saturation condition or a second predetermined level indicative of a minimum power saturation condition, the maximum power saturation condition comprising the transmitted power being at or above a first power level and the minimum power saturation condition comprising the transmitted power being at or below a second power level.

10. The wireless charger of claim 9, wherein the first power level corresponds to a maximum allowable level and the second power level corresponds to a minimum allowable level.

11. The wireless charger of claim 1, wherein the controller is further configured to change the transmitted power by a predetermined amount for a predetermined period of time, and said initiating the disconnection is further based at least in part on a comparison of a detected change of the detected transmitted power level to the predetermined amount.

12. The wireless charger of claim 11, wherein the controller is further configured to select the predetermined amount and the period of time to avoid adversely affecting the transfer of power from the wireless transmitter to chargeable devices properly connected to the wireless transmitter.

13. A method of facilitating avoidance of cross connection of a chargeable device in communication with a wireless charger, the method comprising:

detecting a transmitted power level of the wireless charger when generating a wireless field;

comparing the detected transmitted power level to at least one predetermined level indicative of at least one saturation condition; and initiating a disconnection of a communication link, different than the wireless field, between the wireless charger and the chargeable device based at least in part on whether the at least one saturation condition exists.

14. The method of claim 13, wherein said initiating the disconnection is further based at least in part on a comparison of the detected transmitted power level to a requested change of the transmitted power from the chargeable device.

15. The method of claim 14, wherein the requested change of the transmitted power corresponds to at least one of: a request for an increased level of power when the at least one saturation condition is indicative of a maximum allowable transmitter power level; or a request for a decreased level of power when the at least one saturation condition is indicative of a minimum allowable transmitter power level.

16. The method of claim 13, wherein the at least one predetermined level comprises at least one of a first predetermined level indicative of a maximum power saturation condition or a second predetermined level indicative of a minimum power saturation condition.

17. The method of claim 16, wherein the maximum power saturation condition comprises the transmitted power being at or above a maximum allowable level and the minimum power saturation condition comprises the transmitted power being at or below a minimum allowable level.

18. The method of claim 13, wherein said initiating the disconnection comprises forcing the disconnection after detecting that the at least one saturation condition exists.

19. The method of claim 18, wherein said initiating the disconnection further comprises forcing the disconnection after detecting that the at least one saturation condition persists for a predetermined amount of time.

20. The method of claim 13, further comprising distinguishing between a cross connection condition and a non-cross connection condition in which the at least one saturation condition exists and not initiating a disconnection of the wireless charger from the chargeable device if the non-cross connection condition exists.

21. The method of claim 13, further comprising changing the transmitted power by a predetermined amount for a predetermined period of time and comparing a detected change of the detected transmitted power level to the predetermined amount, wherein said initiating the disconnection is further based at least in part on a result of said comparing the detected change of the detected transmitted power level to the predetermined amount.

22. The method of claim 21, further comprising selecting the predetermined amount and the period of time to avoid adversely affecting the transfer of power from the wireless charger to chargeable devices properly connected to the wireless charger.

23. The method of claim 13, wherein said detecting the transmitted power level, said comparing the detected transmitted power level, and said initiating the disconnection are performed by the wireless charger.

24. The method of claim 13, wherein said detecting the transmitted power level, said comparing the detected transmitted power level, and said initiating the disconnection are performed by the chargeable device.

25. The method of claim 13, wherein at least one of said detecting the transmitted power level, said comparing the detected transmitted power level, and said initiating the disconnection is performed by the wireless charger, and at least one other of said detecting the transmitted power level, said comparing the detected transmitted power level, and said initiating the disconnection is performed by the chargeable device.

26. A wireless charger comprising:
  means for generating a wireless charging field in at least one charging region;
  means for communicating with a chargeable device; and
  means for facilitating avoidance of cross connection of the chargeable device with the wireless charger and at least one other wireless charger by initiating a disconnection of a communication link between the wireless charger and the chargeable device based at least in part on a comparison of a detected transmitted power level of the wireless charger to at least one predetermined level indicative of at least one saturation condition.

27. The wireless charger of claim 26, wherein the means for generating a wireless charging field comprises a wireless power antenna and a wireless power transmitter coupled to the wireless power antenna, and wherein the means for communicating with the chargeable device comprises a communication antenna and a transceiver coupled to the communication antenna.

28. The wireless charger of claim 26, wherein the means for facilitating avoidance of cross connection of the chargeable device with the wireless charger and at least one other wireless charger comprise a controller and the controller is configured to detect the transmitted power level and to compare the detected transmitted power level to the at least one predetermined level indicative of the at least one saturation condition.

29. The wireless charger of claim 26, wherein the means for facilitating avoidance of cross connection initiates the disconnection further based at least in part on a comparison of the detected transmitted power level to a requested change of the transmitted power from the chargeable device.

30. A non-transitory computer-readable medium comprising code that, when executed, causes a wireless charger to:
  generate a wireless charging field in at least one charging region;
  communicate with a chargeable device; and
  facilitate avoidance of cross connection of the chargeable device with the wireless charger and at least one other wireless charger by initiating a disconnection of a communication link between the wireless charger and the chargeable device based at least in part on a comparison of a detected transmitted power level of the wireless charger to at least one predetermined level indicative of at least one saturation condition.

* * * * *